(12) United States Patent
Binder

(10) Patent No.: US 7,522,713 B2
(45) Date of Patent: *Apr. 21, 2009

(54) NETWORK FOR TELEPHONY AND DATA COMMUNICATION

(75) Inventor: Yehuda Binder, Hod Hasharon (IL)

(73) Assignee: Serconet, Ltd., Ra'anana (IL)

(*) Notice: Subject to any disclaimer, the term of this patent is extended or adjusted under 35 U.S.C. 154(b) by 623 days.

This patent is subject to a terminal disclaimer.

(21) Appl. No.: 11/100,461

(22) Filed: Apr. 7, 2005

(65) Prior Publication Data

US 2005/0226226 A1    Oct. 13, 2005

Related U.S. Application Data

(63) Continuation of application No. 11/020,193, filed on Dec. 27, 2004, which is a continuation of application No. 10/773,247, filed on Feb. 9, 2004, now Pat. No. 6,970,538, which is a continuation of application No. 09/357,379, filed on Jul. 20, 1999, now Pat. No. 6,690,677.

(51) Int. Cl.
    *H04M 11/00*    (2006.01)

(52) U.S. Cl. .................... 379/90.01; 379/93.08

(58) Field of Classification Search .............. 379/93.08, 379/90.01, 93.01, 399.01, 399.02, 442, 93.09, 379/93.28; 370/254, 463, 465–467, 487–488, 370/493–495, 497–498

See application file for complete search history.

(56) References Cited

U.S. PATENT DOCUMENTS

| 404,721 | A | 6/1889 | Messer |
| 405,422 | A | 6/1889 | Law et al. |
| 2,568,342 | A | 9/1951 | Koehler et al. |
| 2,680,162 | A | 6/1954 | Brehm et al. |
| 3,406,344 | A | 10/1968 | Hopper |

(Continued)

FOREIGN PATENT DOCUMENTS

JP    1-27358    1/1989

(Continued)

OTHER PUBLICATIONS

48-Volt DC Power Supply Connection Guide; 3Com Published Mar. 2000 (12 pages).

(Continued)

*Primary Examiner*—Stella L Woo
(74) *Attorney, Agent, or Firm*—Browdy and Neimark, P.L.L.C.

(57) ABSTRACT

A service outlet for coupling a data unit to a wired digital data signal and for coupling a service unit to an analog service signal, for use with a service wire pair installed in walls of a building, the service wire pair concurrently carrying a wired bi-directional digital data signal and an analog service signal carried over a service signal frequency band, using frequency division multiplexing, wherein the wired digital data signal is carried over a frequency band distinct from the service signal frequency band. The outlet has a single enclosure and, within the enclosure: a wiring connector; first and second filters coupled to the wiring connector; a service connector coupled to the first filter and connectable to the service unit for coupling the service unit to the analog service signal; a service wiring modem coupled to the second filter; and a power supply coupled to the service wiring modem.

34 Claims, 11 Drawing Sheets

U.S. PATENT DOCUMENTS

| | | |
|---|---|---|
| 3,511,936 A | 5/1970 | Saltzberg |
| 3,529,088 A | 9/1970 | Hauer |
| 3,539,727 A | 11/1970 | Pasternack |
| 3,651,471 A | 3/1972 | Hasselwood et al. |
| 3,699,523 A | 10/1972 | Percher |
| 3,723,653 A | 3/1973 | Tatsuzawa |
| 3,835,334 A | 9/1974 | Notteau |
| 3,870,822 A | 3/1975 | Matthews |
| 3,872,253 A | 3/1975 | Jurschak |
| 3,873,771 A | 3/1975 | Kleinerman et al. |
| 3,875,339 A | 4/1975 | Gruen et al. |
| 3,922,490 A | 11/1975 | Pettis |
| 3,937,889 A | 2/1976 | Bell, III et al. |
| 3,968,333 A | 7/1976 | Simokat et al. |
| 3,992,589 A | 11/1976 | Kuegler |
| 4,008,369 A | 2/1977 | Theurer et al. |
| 4,035,838 A | 7/1977 | Bassani et al. |
| 4,054,910 A | 10/1977 | Chou et al. |
| 4,171,467 A | 10/1979 | Evenchik |
| 4,197,431 A | 4/1980 | Vis |
| 4,206,320 A | 6/1980 | Keasler et al. |
| 4,232,200 A | 11/1980 | Hestad et al. |
| 4,241,243 A | 12/1980 | Ball |
| 4,302,629 A | 11/1981 | Foulkes et al. |
| 4,328,579 A | 5/1982 | Hashimoto et al. |
| 4,332,980 A | 6/1982 | Reynolds et al. |
| 4,339,816 A | 7/1982 | Reed |
| 4,373,117 A | 2/1983 | Pierce |
| 4,378,470 A | 3/1983 | Murto et al. |
| 4,387,271 A | 6/1983 | Artom |
| 4,388,489 A | 6/1983 | Wigan et al. |
| 4,393,508 A | 7/1983 | Boudault |
| 4,395,590 A | 7/1983 | Pierce |
| 4,415,774 A | 11/1983 | Driver |
| 4,417,099 A | 11/1983 | Pierce |
| 4,425,642 A | 1/1984 | Moses et al. |
| 4,431,869 A | 2/1984 | Sweet |
| 4,433,212 A | 2/1984 | Moses et al. |
| 4,442,320 A | 4/1984 | James et al. |
| 4,442,540 A | 4/1984 | Allen |
| 4,443,662 A | 4/1984 | Nakhla |
| 4,449,218 A | 5/1984 | Strehl |
| 4,456,985 A | 6/1984 | Carsten et al. |
| 4,456,986 A | 6/1984 | Carsten et al. |
| 4,459,434 A | 7/1984 | Benning et al. |
| 4,485,400 A | 11/1984 | Lemelson et al. |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,521,881 A | 6/1985 | Stapleford et al. |
| 4,523,307 A | 6/1985 | Brown et al. |
| 4,528,422 A | 7/1985 | Cupani |
| 4,543,450 A | 9/1985 | Brandt |
| 4,546,212 A | 10/1985 | Crowder, Sr. |
| 4,561,020 A | 12/1985 | Matsuda |
| 4,564,940 A | 1/1986 | Yahata |
| 4,577,311 A | 3/1986 | Duquesne et al. |
| 4,577,314 A | 3/1986 | Chu et al. |
| 4,578,533 A | 3/1986 | Pierce |
| 4,578,535 A | 3/1986 | Simmons |
| 4,578,540 A | 3/1986 | Borg et al. |
| 4,580,291 A | 4/1986 | Ab Der Halden |
| 4,583,214 A | 4/1986 | Miyashiita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,604,741 A | 8/1986 | Barsellotti |
| 4,608,686 A | 8/1986 | Barsellotti |
| 4,639,714 A | 1/1987 | Crowe |
| 4,642,607 A | 2/1987 | Strom et al. |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,656,655 A | 4/1987 | Hashimoto |
| 4,665,516 A | 5/1987 | Middleton et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,677,646 A | 6/1987 | Dodds et al. |
| 4,679,227 A | 7/1987 | Hughes-Hartogs |
| 4,691,344 A | 9/1987 | Brown et al. |
| 4,709,412 A | 11/1987 | Seymour et al. |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,742,538 A | 5/1988 | Szlam |
| 4,754,326 A | 6/1988 | Kram et al. |
| 4,757,495 A | 7/1988 | Decker et al. |
| 4,757,497 A | 7/1988 | Beierle et al. |
| 4,761,646 A | 8/1988 | Choquet et al. |
| 4,764,922 A | 8/1988 | Dieter et al. |
| 4,766,402 A | 8/1988 | Crane |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,785,448 A | 11/1988 | Reichart et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,803,719 A | 2/1989 | Ulrich |
| 4,807,225 A | 2/1989 | Fitch |
| 4,815,106 A | 3/1989 | Propp et al. |
| 4,821,319 A | 4/1989 | Middleton et al. |
| 4,825,435 A | 4/1989 | Amundsen et al. |
| 4,837,799 A | 6/1989 | Prohs et al. |
| 4,839,743 A | 6/1989 | Best et al. |
| 4,849,811 A | 7/1989 | Kleinerman |
| 4,866,602 A | 9/1989 | Hall |
| 4,882,747 A | 11/1989 | Williams |
| 4,885,747 A | 12/1989 | Foglia |
| 4,885,766 A | 12/1989 | Yasuoka et al. |
| 4,888,795 A | 12/1989 | Ando et al. |
| 4,890,316 A | 12/1989 | Walsh et al. |
| 4,893,326 A | 1/1990 | Duran et al. |
| 4,901,342 A | 2/1990 | Jones |
| 4,918,688 A | 4/1990 | Krause et al. |
| 4,918,690 A | 4/1990 | Markkula, Jr. et al. |
| 4,924,492 A | 5/1990 | Gitlin et al. |
| 4,932,022 A | 6/1990 | Keeney et al. |
| 4,932,047 A | 6/1990 | Emmons et al. |
| 4,939,728 A | 7/1990 | Markkula, Jr. et al. |
| 4,945,404 A | 7/1990 | Miller |
| 4,947,483 A | 8/1990 | Dirr |
| 4,949,187 A | 8/1990 | Cohen |
| 4,953,160 A | 8/1990 | Gupta |
| 4,954,886 A | 9/1990 | Elberbaum |
| 4,955,048 A | 9/1990 | Iwamura et al. |
| 4,969,136 A | 11/1990 | Chamberlain et al. |
| 4,969,147 A | 11/1990 | Markkula, Jr. et al. |
| 4,973,954 A | 11/1990 | Schwarz |
| 4,975,896 A | 12/1990 | D'Agosto, III et al. |
| 4,975,906 A | 12/1990 | Takiyasu et al. |
| 4,979,028 A | 12/1990 | Minematsu et al. |
| 4,985,892 A | 1/1991 | Camarata |

| Patent No. | Kind | Date | Inventor |
|---|---|---|---|
| 4,989,081 | A | 1/1991 | Miyagawa et al. |
| 4,996,709 | A | 2/1991 | Heep et al. |
| 5,010,399 | A | 4/1991 | Goodman et al. |
| 5,014,308 | A | 5/1991 | Fox |
| 5,018,138 | A | 5/1991 | Twitty et al. |
| 5,032,819 | A | 7/1991 | Sakuragi et al. |
| 5,033,062 | A | 7/1991 | Morrow et al. |
| 5,034,883 | A | 7/1991 | Donaldson et al. |
| 5,036,513 | A | 7/1991 | Greenblatt |
| 5,051,822 | A | 9/1991 | Rhoades |
| 5,065,133 | A | 11/1991 | Howard |
| 5,089,886 | A | 2/1992 | Grandmougin |
| 5,090,052 | A | 2/1992 | Nakajima et al. |
| 5,095,497 | A | 3/1992 | Aman et al. |
| 5,113,498 | A | 5/1992 | Evan et al. |
| 5,125,077 | A | 6/1992 | Hall |
| 5,144,544 | A | 9/1992 | Jenneve et al. |
| 5,148,144 | A | 9/1992 | Sutterlin et al. |
| 5,157,711 | A | 10/1992 | Shimanuki |
| 5,175,764 | A | 12/1992 | Patel et al. |
| 5,181,240 | A | 1/1993 | Sakuragi et al. |
| 5,210,788 | A | 5/1993 | Nilssen |
| 5,216,704 | A | 6/1993 | Williams et al. |
| 5,220,597 | A | 6/1993 | Horiuchi |
| 5,224,154 | A | 6/1993 | Aldridge et al. |
| 5,247,347 | A | 9/1993 | Litteral et al. |
| 5,255,267 | A | 10/1993 | Hansen et al. |
| 5,257,006 | A | 10/1993 | Graham et al. |
| 5,283,637 | A | 2/1994 | Goolcharan |
| 5,289,359 | A | 2/1994 | Ziermann |
| 5,323,461 | A | 6/1994 | Rosenbaum et al. |
| 5,343,514 | A | 8/1994 | Snyder |
| 5,347,549 | A | 9/1994 | Baumann |
| 5,351,272 | A | 9/1994 | Abraham |
| 5,353,334 | A | 10/1994 | O'Sullivan |
| 5,363,432 | A | 11/1994 | Martin et al. |
| 5,379,005 | A | 1/1995 | Aden et al. |
| 5,391,932 | A | 2/1995 | Small et al. |
| 5,406,260 | A | 4/1995 | Cummings et al. |
| 5,408,260 | A | 4/1995 | Arnon |
| 5,410,343 | A | 4/1995 | Coddington et al. |
| 5,420,578 | A | 5/1995 | O'Brien et al. |
| 5,420,886 | A | 5/1995 | Ohmori |
| 5,424,710 | A | 6/1995 | Baumann |
| 5,428,682 | A | 6/1995 | Apfel |
| 5,452,289 | A | 9/1995 | Sharma et al. |
| 5,454,008 | A | 9/1995 | Baumann et al. |
| 5,461,671 | A | 10/1995 | Sakuragi et al. |
| 5,463,616 | A | 10/1995 | Kruse et al. |
| 5,475,687 | A | 12/1995 | Markkula, Jr. et al. |
| 5,483,574 | A | 1/1996 | Yuyama |
| 5,530,748 | A | 6/1996 | Ohmori |
| 5,539,805 | A | 7/1996 | Bushue et al. |
| 5,544,243 | A | 8/1996 | Papadopoulos |
| 5,546,385 | A | 8/1996 | Caspi et al. |
| 5,548,592 | A | 8/1996 | Komarek et al. |
| 5,548,614 | A | 8/1996 | Stoll et al. |
| 5,550,836 | A | 8/1996 | Albrecht et al. |
| 5,553,063 | A | 9/1996 | Dickson |
| 5,553,138 | A | 9/1996 | Heald et al. |
| 5,568,547 | A | 10/1996 | Nishimura |
| 5,570,085 | A | 10/1996 | Bertsch |
| 5,574,748 | A | 11/1996 | Vander Mey et al. |
| 5,583,934 | A | 12/1996 | Zhou |
| 5,587,692 | A | 12/1996 | Graham et al. |
| 5,599,206 | A | 2/1997 | Slack et al. |
| 5,608,792 | A | 3/1997 | Laidler |
| 5,610,916 | A | 3/1997 | Kostreski et al. |
| 5,621,455 | A | 4/1997 | Rogers et al. |
| 5,625,863 | A | 4/1997 | Abraham |
| 5,646,983 | A | 7/1997 | Suffern et al. |
| 5,651,696 | A | 7/1997 | Jennison |
| 5,659,608 | A | 8/1997 | Stiefel |
| 5,675,375 | A | 10/1997 | Riffee |
| 5,682,423 | A | 10/1997 | Walker |
| 5,684,826 | A | 11/1997 | Ratner |
| 5,696,790 | A | 12/1997 | Graham et al. |
| 5,706,007 | A | 1/1998 | Fragnito et al. |
| 5,706,157 | A | 1/1998 | Galecki et al. |
| 5,708,701 | A | 1/1998 | Houvig et al. |
| 5,742,527 | A | 4/1998 | Rybicki et al. |
| 5,748,634 | A | 5/1998 | Sokol et al. |
| 5,757,803 | A | 5/1998 | Russell et al. |
| 5,778,303 | A | 7/1998 | Shinozaki et al. |
| 5,787,115 | A | 7/1998 | Turnball et al. |
| 5,799,069 | A | 8/1998 | Weston et al. |
| 5,802,283 | A | 9/1998 | Grady et al. |
| 5,805,053 | A | 9/1998 | Patel et al. |
| 5,812,786 | A | 9/1998 | Seazholtz et al. |
| 5,815,681 | A | 9/1998 | Kikinis |
| 5,818,710 | A | 10/1998 | LeVan Suu |
| 5,818,821 | A | 10/1998 | Schurig |
| 5,835,005 | A | 11/1998 | Furukawa et al. |
| 5,841,360 | A | 11/1998 | Binder |
| 5,841,840 | A | 11/1998 | Smith et al. |
| 5,841,841 | A | 11/1998 | Dodds et al. |
| 5,842,032 | A | 11/1998 | Bertsch |
| 5,844,888 | A | 12/1998 | Markkula et al. |
| 5,848,150 | A | 12/1998 | Bingel |
| 5,878,047 | A | 3/1999 | Ganek et al. |
| 5,878,133 | A | 3/1999 | Zhou et al. |
| 5,884,086 | A | 3/1999 | Amoni et al. |
| 5,892,792 | A | 4/1999 | Walley |
| 5,896,443 | A | 4/1999 | Dichter |
| 5,903,213 | A | 5/1999 | Hodge et al. |
| 5,912,895 | A | 6/1999 | Terry et al. |
| 5,930,340 | A | 7/1999 | Bell |
| 5,938,757 | A | 8/1999 | Bertsch |
| 5,940,400 | A | 8/1999 | Eastmond et al. |
| 5,949,476 | A | 9/1999 | Pocock et al. |
| 5,960,066 | A | 9/1999 | Hartmann et al. |
| 5,963,539 | A | 10/1999 | Webber, Jr. et al. |
| 5,963,595 | A | 10/1999 | Graham et al. |
| 5,982,784 | A | 11/1999 | Bell |
| 5,994,998 | A | 11/1999 | Fisher et al. |
| 5,995,598 | A | 11/1999 | Berstis |
| 6,002,722 | A | 12/1999 | Wu |
| 6,005,873 | A | 12/1999 | Amit |
| 6,011,794 | A | 1/2000 | Mordowitz et al. |
| 6,026,150 | A | 2/2000 | Frank |
| 6,038,425 | A | 3/2000 | Jeffrey |
| 6,052,380 | A | 4/2000 | Bell |
| 6,061,357 | A | 5/2000 | Olshansky et al. |
| 6,061,392 | A | 5/2000 | Bremer et al. |
| 6,069,899 | A | 5/2000 | Foley |
| 6,087,860 | A | 7/2000 | Liu et al. |
| 6,088,368 | A | 7/2000 | Rubinstain et al. |
| 6,094,441 | A | 7/2000 | Jung et al. |
| 6,107,912 | A | 8/2000 | Bullock et al. |
| 6,108,330 | A | 8/2000 | Bhatia et al. |
| 6,111,764 | A | 8/2000 | Atou et al. |
| 6,115,468 | A | 9/2000 | De Nicolo |
| 6,115,755 | A | 9/2000 | Krishan |
| 6,130,893 | A | 10/2000 | Whittaker et al. |
| 6,130,896 | A | 10/2000 | Lueker et al. |
| 6,137,865 | A | 10/2000 | Ripy et al. |
| 6,141,356 | A | 10/2000 | Gorman |
| 6,151,480 | A | 11/2000 | Fischer et al. |
| 6,157,716 | A | 12/2000 | Ortel |
| 6,175,860 | B1 | 1/2001 | Gaucher |
| 6,192,399 | B1 | 2/2001 | Goodman |
| 6,202,211 | B1 | 3/2001 | Williams, Jr. |
| 6,212,227 | B1 | 4/2001 | Ko et al. |
| 6,212,274 | B1 | 4/2001 | Ninh |
| 6,215,789 | B1 | 4/2001 | Keenan et al. |
| 6,216,160 | B1 | 4/2001 | Dichter |

| Patent No. | Date | Inventor |
|---|---|---|
| 6,218,930 B1 | 4/2001 | Katzenberg et al. |
| 6,227,499 B1 | 5/2001 | Jennison et al. |
| 6,236,664 B1 | 5/2001 | Erreygers |
| 6,240,166 B1 | 5/2001 | Collin et al. |
| 6,246,748 B1 | 6/2001 | Yano |
| 6,252,957 B1 | 6/2001 | Jauregui et al. |
| 6,256,518 B1 | 7/2001 | Buhrmann |
| 6,285,754 B1 | 9/2001 | Sun et al. |
| 6,292,467 B1 | 9/2001 | Keller |
| 6,292,517 B1 | 9/2001 | Jeffress et al. |
| 6,295,356 B1 | 9/2001 | De Nicolo |
| 6,310,894 B1 | 10/2001 | Counterman |
| 6,320,866 B2 | 11/2001 | Wolf et al. |
| 6,320,900 B1 | 11/2001 | Liu |
| 6,324,268 B1 | 11/2001 | Balachandran et al. |
| 6,349,133 B1 | 2/2002 | Matthews et al. |
| 6,356,562 B1 | 3/2002 | Bamba |
| 6,370,149 B1 | 4/2002 | Gorman et al. |
| 6,389,125 B1 | 5/2002 | Ubowski |
| 6,393,050 B1 | 5/2002 | Liu |
| 6,396,391 B1 | 5/2002 | Binder |
| 6,414,952 B2 | 7/2002 | Foley |
| 6,424,661 B1 | 7/2002 | Bentley |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,449,318 B1 | 9/2002 | Rumbaugh |
| 6,449,348 B1 | 9/2002 | Lamb et al. |
| 6,470,053 B1 | 10/2002 | Liu |
| 6,473,495 B1 | 10/2002 | Willer |
| 6,473,608 B1 | 10/2002 | Lehr et al. |
| 6,480,510 B1 | 11/2002 | Binder |
| 6,483,902 B1 | 11/2002 | Stewart et al. |
| 6,510,204 B2 | 1/2003 | De Clercq et al. |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,581 B1 | 2/2003 | Edson |
| 6,532,279 B1 | 3/2003 | Goodman |
| 6,532,280 B1 | 3/2003 | McDonald |
| 6,535,587 B1 | 3/2003 | Kobayashi |
| 6,539,011 B1 | 3/2003 | Keenan et al. |
| 6,549,616 B1 | 4/2003 | Binder |
| 6,556,581 B1 | 4/2003 | He et al. |
| 6,560,319 B1 | 5/2003 | Binder |
| 6,560,333 B1 | 5/2003 | Consiglio et al. |
| 6,563,816 B1 | 5/2003 | Nodoushani et al. |
| 6,567,981 B1 | 5/2003 | Jeffrey |
| 6,570,890 B1 | 5/2003 | Keenan et al. |
| 6,574,242 B1 | 6/2003 | Keenan et al. |
| 6,574,313 B1 | 6/2003 | Chea, Jr. et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,580,785 B2 | 6/2003 | Bremer et al. |
| 6,584,197 B1 | 6/2003 | Boudreaux, Jr. et al. |
| 6,587,454 B1 | 7/2003 | Lamb |
| 6,587,473 B2 | 7/2003 | Terry et al. |
| 6,587,479 B1 | 7/2003 | Bianchi et al. |
| 6,587,560 B1 | 7/2003 | Scott et al. |
| 6,603,808 B1 | 8/2003 | Anne et al. |
| 6,640,308 B1 | 10/2003 | Keyghobad et al. |
| 6,643,566 B1 | 11/2003 | Lehr et al. |
| 6,650,622 B1 | 11/2003 | Austerman, III et al. |
| 6,653,932 B1 | 11/2003 | Beamish et al. |
| 6,658,098 B2 | 12/2003 | Lamb et al. |
| 6,658,108 B1 | 12/2003 | Bissell et al. |
| 6,665,404 B2 | 12/2003 | Cohen |
| 6,678,321 B1 | 1/2004 | Graham et al. |
| 6,678,721 B1 | 1/2004 | Bell |
| 6,681,013 B1 | 1/2004 | Miyamoto |
| 6,690,677 B1 | 2/2004 | Binder |
| 6,690,792 B1 | 2/2004 | Robinson et al. |
| 6,693,916 B1 | 2/2004 | Chaplik et al. |
| 6,697,358 B2 | 2/2004 | Berstein |
| 6,701,406 B1 | 3/2004 | Chang et al. |
| 6,710,704 B2 | 3/2004 | Fisher et al. |
| 6,711,138 B1 | 3/2004 | Pai et al. |
| 6,721,365 B1 | 4/2004 | Yin et al. |
| 6,721,419 B1 | 4/2004 | Stell et al. |
| 6,721,790 B1 | 4/2004 | Chen |
| 6,732,315 B2 | 5/2004 | Yagil et al. |
| 6,735,217 B1 | 5/2004 | Webber, Jr. et al. |
| 6,738,382 B1 | 5/2004 | West et al. |
| 6,738,597 B1 | 5/2004 | Jeung et al. |
| 6,744,883 B1 | 6/2004 | Bingel |
| 6,748,078 B1 | 6/2004 | Posthuma |
| 6,754,186 B1 | 6/2004 | Bullman |
| 6,763,097 B1 | 7/2004 | Vitenberg |
| 6,763,109 B1 | 7/2004 | Hoskins |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,299 B1 | 8/2004 | Olson et al. |
| 6,778,549 B1 | 8/2004 | Keller |
| 6,778,646 B1 | 8/2004 | Sun |
| 6,785,296 B1 | 8/2004 | Bell |
| 6,795,539 B2 | 9/2004 | Culli et al. |
| 6,815,844 B2 | 11/2004 | Kovarik |
| 6,819,760 B1 | 11/2004 | Nayler |
| 6,831,975 B1 | 12/2004 | Easwaran et al. |
| 6,831,976 B1 | 12/2004 | Comerford et al. |
| 6,836,546 B1 | 12/2004 | Willer |
| 6,839,345 B2 | 1/2005 | Lu et al. |
| 6,842,459 B1 | 1/2005 | Binder |
| 6,847,718 B1 | 1/2005 | Hiraoka |
| 6,856,799 B1 | 2/2005 | Ritter |
| 6,862,353 B2 | 3/2005 | Rabenko et al. |
| 6,865,193 B2 | 3/2005 | Terk |
| 6,868,072 B1 | 3/2005 | Lin et al. |
| 6,904,134 B2 | 6/2005 | Jeon et al. |
| 6,909,725 B1 | 6/2005 | Chow |
| 6,917,681 B2 | 7/2005 | Robinson et al. |
| 6,922,407 B2 | 7/2005 | Wu |
| 6,925,089 B2 | 8/2005 | Chow et al. |
| 6,934,754 B2 | 8/2005 | West et al. |
| 6,937,056 B2 | 8/2005 | Binder |
| 6,941,364 B2 | 9/2005 | Kim et al. |
| 6,947,736 B2 | 9/2005 | Shaver et al. |
| 6,956,826 B1 | 10/2005 | Binder |
| 6,961,303 B1 | 11/2005 | Binder |
| 6,963,559 B2 | 11/2005 | Elo |
| 6,970,538 B2 * | 11/2005 | Binder .................... 379/90.01 |
| 6,973,394 B2 | 12/2005 | Jaeger et al. |
| 6,989,733 B2 | 1/2006 | Simonsen et al. |
| 6,996,213 B1 | 2/2006 | De Jong |
| 6,996,729 B2 | 2/2006 | Volkening et al. |
| 6,998,964 B2 | 2/2006 | Lomax, Jr. et al. |
| 7,003,102 B2 | 2/2006 | Kiko |
| 7,009,946 B1 | 3/2006 | Kardach |
| 7,016,377 B1 | 3/2006 | Chun et al. |
| 7,053,501 B1 | 5/2006 | Barrass |
| 7,054,303 B2 | 5/2006 | Miyazaki et al. |
| 7,079,647 B2 | 7/2006 | Tomobe |
| 7,095,848 B1 | 8/2006 | Fischer et al. |
| 7,095,849 B2 | 8/2006 | Smith et al. |
| 7,099,368 B2 | 8/2006 | Santhoff et al. |
| 7,099,707 B2 | 8/2006 | Amin et al. |
| 7,106,721 B1 | 9/2006 | Binder |
| 7,113,574 B1 | 9/2006 | Haas et al. |
| 7,142,560 B2 | 11/2006 | Mansfield |
| 7,142,563 B1 | 11/2006 | Lin |

| | | | |
|---|---|---|---|
| 7,149,474 | B1 | 12/2006 | Mikhak |
| 7,154,996 | B2 | 12/2006 | Strauss |
| 2002/0006137 | A1 | 1/2002 | Rabenko et al. |
| 2002/0015489 | A1 | 2/2002 | Ben-David |
| 2002/0057581 | A1 | 5/2002 | Nadav |
| 2002/0076038 | A1 | 6/2002 | Barrese et al. |
| 2002/0110236 | A1 | 8/2002 | Karnad |
| 2002/0128009 | A1 | 9/2002 | Boch et al. |
| 2002/0144159 | A1 | 10/2002 | Wu et al. |
| 2002/0176567 | A1 | 11/2002 | Chen et al. |
| 2002/0180592 | A1 | 12/2002 | Gromov |
| 2002/0198952 | A1 | 12/2002 | Bell |
| 2003/0016794 | A1 | 1/2003 | Brothers |
| 2003/0058085 | A1 | 3/2003 | Fisher et al. |
| 2003/0061522 | A1 | 3/2003 | Ke et al. |
| 2003/0099076 | A1 | 5/2003 | Elkayam et al. |
| 2003/0107269 | A1 | 6/2003 | Jetzt |
| 2003/0112965 | A1 | 6/2003 | McNamera et al. |
| 2003/0146765 | A1 | 8/2003 | Darshan et al. |
| 2003/0179869 | A1 | 9/2003 | Yoshitani |
| 2003/0194912 | A1 | 10/2003 | Ferentz |
| 2003/0206623 | A1 | 11/2003 | Deichstetter et al. |
| 2003/0207697 | A1 | 11/2003 | Shpak |
| 2004/0083262 | A1 | 4/2004 | Trantow |
| 2004/0090984 | A1 | 5/2004 | Saint-Hilaire et al. |
| 2004/0107299 | A1 | 6/2004 | Lee et al. |
| 2004/0204040 | A1 | 10/2004 | Heijnen |
| 2004/0268160 | A1 | 12/2004 | Atkinson et al. |
| 2005/0038875 | A1 | 2/2005 | Park |
| 2005/0086694 | A1 | 4/2005 | Hicks et al. |
| 2006/0153169 | A1 | 7/2006 | Koifman et al. |
| 2006/0193310 | A1 | 8/2006 | Landry et al. |
| 2006/0193313 | A1 | 8/2006 | Landry et al. |
| 2006/0215680 | A1 | 9/2006 | Camagna |
| 2006/0238250 | A1 | 10/2006 | Camagna et al. |
| 2006/0251094 | A1 | 11/2006 | Van Vleck et al. |
| 2006/0251159 | A1 | 11/2006 | Huotari et al. |
| 2006/0251179 | A1 | 11/2006 | Ghoshal |
| 2006/0280197 | A1 | 12/2006 | Stone |
| 2006/0291493 | A1 | 12/2006 | Schley-May et al. |

FOREIGN PATENT DOCUMENTS

| | | |
|---|---|---|
| WO | WO 96/23377 | 8/1996 |
| WO | WO 98/02985 | 1/1998 |
| WO | WO 99/03255 A1 | 1/1999 |
| WO | WO 99/12330 A1 | 3/1999 |

OTHER PUBLICATIONS

SuperStack II PS Hub User Guide; 3Com Published Jul. 1997 (188 pages).
SuperStack II Entry Hub User Guide; 3Com Published Nov. 1996 (8 pages).
SuperStack II Baseline Switch User Guide; 3Com Published Mar. 1998 (8 pages).
SuperStack II Baseline 10/100 switch; 3Com Published Apr. 1998 (8 pages).
SuperStack II Desktop Switch User Guide; 3Com Published Jun. 1997 (148 pages).
SuperStack II Switch 610 User Guide; 3Com Published May 1999 (54 pages).
Line carrier modems—1: Build a Pair of Line-Carrier Modems (Part 1); Radio Electronics, Jul. 1988, pp. 87-91 by Keith Nichols (7 pages).
Line carrier modems—2: Build a Pair of Line-Carrier Modems (Part 2); Radio Electronics, Aug. 1988, pp. 88-96 by Keith Nichols (5 pages).
Universal Serial Bus Specification Revision 1.0; Jan. 15, 1996 (268 pages).
Cisco Catalyst 5000; Industry's First Modular, Multilayer-Capable switching System for the Wiring Closet; Posted May 16, 1996 (22 pages).
Canned Heat; Data Communications Feb. 1996 (10 pages).
Fast Ethernet 100-Mbps Solutions; Posted Mar. 112, 1996 (10 pages).
Forget the Forklift; Data Communications Sep. 1996 (11 pages).
LAN Emulation; Posted Nov. 15, 1995 (16 pages).
IBM LAN Bridge and Switch Summary, IBM, published Jan. 1996 (70 pages).
Continuation of IBM LAN Bridge and Switch Summary, IBM, published Jan. 1996 (70 pages).
IEEE Standard for a High Performance serial Bus; IEEE Std 1394-1995 Published 1996 (392 pages).
DSLPipe Reference Guide; by Ascend Communications, Jun. 2, 1997 (162 pages).
DSLPipe User's Guide; by Ascend Communications, Jun. 3, 1997 (245 pages).
Ascend DSLPipe-S Features and specifications; Posted May 12, 1997 (4 pages).
CiscoPro EtherSwitch CPW2115; Dec. 1995 (4 pages).
HART Field Communication Protocol—An introduction for users and manufacturers' published by the HART Communication Foundation, Austin, Texas, Oct. 1995 (12 pages).
SuperStack II Desktop Switch; 3Com Sep. 1996 (2 pages).
"The DSL Sourcebook", Paradyne Corporation, Copyright 2000, DSL-BOOK-3.0-0900, 98 pages.
Olshansky, "A Full Service Network for the Copper Plant", Telephony, 1985, pp. 52-60.
Instant Network Rules on Phone Lines, Electronic Design, 1987.
O. Agazzi, et al., "Large Scale Integration of Hybrid-Method Digital Subscriber Loops, "IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
J. Alves, "Data Over Voice—A Low Cost LAN Alternative", Communications Show and Conference, MECOM 87, January, pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.
T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault, et al., "Resaux Domestiques et Terminaux Audiovisuels Numeriques", L'Echo Des Recherches, No. 126, 1986, pp. 37-46.
H. Fuchs, et al., "Providing Full Duplex Transmission Over Two-Wire Subscriber Loops", Telephony, vol. 208, No. 11, Mar. 18, 1985, pp. 76, 77, 78 and 84.
H. Fukagawa, et al., "Bus Wiring System for Residences", Matsushita Electric Works Technical Report, No. 36, Feb. 1988, pp. 31-35.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subscriber Loop", IEEE Journal of Solid State Circuitry, vol. S.C. 20, No. 3, Jun. 1985 pp. 671-678.
R. Jelski, "Subscriber Subcarrier System—A New Life,"Communications International, vol. 4, No. 5, May 1977, pp. 29-30.
A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.

T. Masuda, et al., "2-Wire Video Intercom System with Telephone", National Technical Report, vol. 37, No. 6, Dec. 1991, pp. 74-80.

T. Matthews, "Telecomm System is Nerve Center", Infosystems, vol. 31, No. 5, May 1984, pp. 68-69.

J. K. Merrow, "A New Approach to Integrating Local Area Data and Voice Transmission," Telephony, vol. 250, No. 17, Oct. 1983, 2 pages.

H. Morgan, "Two-Wire Full-Duplex Modem Simplifies Voice and Data Networking", Mini-Micro Systems, vol. 17, No. 3, Mar. 1984, 4 pages.

R. Murakoshi, "Home Automation", Journal of the Society of Instrument and Control Engineers, vol. 23, No. 11, Nov. 1984, pp. 955-958.

R.D. Nash, et al., "Simultaneous Transmission of Speech and Data Over An Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.

H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

R.A. Tatum, "Project Victoria—the 7-in-1 Solution", Telephone Engineer and Management, vol. 90, No. 1, Jan. 1, 1986, pp. 47 and 50.

A. Teshima, et al., "Still Video Telecommunication Over the Analog Telephone Network", Journal of the Institute of Television Engineers of Japan, vol. 42, No. 11, Nov. 1988, pp. 1162-1167.

S.R. Treves, et al., "Text, Image and Data Integration in a Distributed Control Digital Voice Switching System", International Switching Symposium—ISS '81 CIC, Sep. 21-25, 1981, Montreal, Quebec, Canada, pp. 1-7.

T. Tsuda, et al., "Experimental In-House Multiservice Communication System", Fujitsu Scientific and Technical Journal, vol. 16, No. 3, Sep. 1980, pp. 29-45.

K. Urui, "Integrated Voice/Data Digital EPBX", Toshiba Review, No. 150, Winter 1984, pp. 30-33.

A.F. Van Den Berg, et al., "Principles van de Modem: Technieken en Specificaties", Elektronica, vol. 32, No. 5, Mar. 9, 1984, pp. 11, 13, 15, 17, 19 and 21.

M.G. Vry, et al., "Digital 1+1 Systems for Local Network Enhancement", Conference on Communications Equipment and Systems, Apr. 20-22, 1982, Birmingham, United Kingdom, pp. 61-64.

M.G. Vry, et al., "The Design of a 1+1 System for Digital Signal Transmission to the Subscriber", NTG-Bachberichte, vol. 73, 1980, pp. 36-40.

J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.

K. Yamamoto, "A Home Terminal System Using the Home Area Information Network", IEEE Transactions on Consumer Electronics, vol. CE-30, No. 4, Nov. 1984, pp. 608-616.

"Centrex LAN Can Provide Advanced Network Capabilities Over the Existing Telephone Wires", Communications News, vol. 25, No. 6, Jun. 1988, p. 27.

"Data Over Voice is Solution for Corporate Network", Telephone Engineer and Management, vol. 91, No. 9, May 1, 1987, pp. 67-69.

"Data Carrier System Allows Simultaneous Voice/Data Transmission for PABX Telephone Systems", Computer Design, vol. 21, No. 5, May 1982, pp. 68 and 70.

"Computerized Telephone System Integrates Voice and Data Switching", Computer Design, vol. 20, No. 4, Apr. 1981, 6 pages.

"AT&T's Systemax Premises Distribution System Solves Networking Problems", Fiber Optics Magazine, vol. 12, No. 4, Jul.-Aug. 1990, pp. 14-16.

M.M. Anderson, "Video Services on Copper", Conference: ICC 91, International Conference on Communications Conference Record, Jun. 2-26, 1991, Denver, CO, pp. 302-306.

M. Bastian, "Voice-Data Integration: An Architecture Perspective," IEEE Communications Magazine, vol. 24, No. 7, Jul. 1986, pp. 8-12.

M. Boubekker, "Bandwidth Reduction for the Transmission of Sign Language Over Telephone Lines", Proceedings of the SPIE-The International Society for Optical Engineering, vol. 1001, Part. 1, 1988, pp. 223-230.

S. Bramblett, "Connect Terminals to Your CPU Over PBX Telephone Lines", EDN, vol. 31, No. 5, Mar. 6, 1986, pp. 239-243, 245, 246 and 248.

Edward Cooper, Broadband Network Technology-An overview for the data and communications industries, Sytek Systems, Mountain View, CA, 1984 (4 pages).

Grayson Evans, The Cebus Standard User's Guide May 1996 (317 pages).

Technical Report TR-001 ADSL Forum System Reference Model May 1996 (6 pages).

Cisco Catalyst 5000 Group Switching Ethernet Modules Data Sheets; 1996 (2 pages).

Cisco Catalyst 5000 Switching System Data Sheets; 1996 (2 pages).

Cisco Catalyst 5000 ATM LAN Emulation Module Data Sheets; 1995 (2 pages).

Cisco Catalyst 5000 Family Fast EtherChannel Switching Modules Data Sheets; 1999 (3 pages).

Motorola CableComm CyberSURFR Cable Modem Specifications; Apr. 1998 (4 pages).

Chow et al., "A Multi-drop In-house ADSL Distribution Network", International Conference on Communication, 1994, pp. 456-460.

3ComImpact IQ External ISDN Modem User product brochure; Published Jun. 1996 (4 pages).

3ComImpact IQ External ISDN Modem User Guide; Published Jul. 1997 (157 pages).

Cisco Catalyst 5000 Series Configuration Worksheet, 1996 (11 pages).

Cisco Catalyst 5000 Product Announcement, Published 1996 (22 pages).

Cisco Catalyst 5000 ATM Dual PHY LAN Emulation Module; Posted Sep. 24, 1996 (4 pages).

Cisco Catalyst 5000 Group Switching Ethernet Modules; Posted May 6, 1996 (5 pages).

The Mac Reborn; Macworld Sep. 1996, pp. 104-115 (16 pages).

The Mac reborn; Macworld vol. 13, Issue 9, Sep. 1996 (9 pages).

M. Inoue, et al.; "A Home Automation System"; IEEE Transactions on Consumer Electronics, vol. CE-31, No. 3, Aug. 1985, pp. 516-527.

S. Motoyama, et al.; "A Subscriber Loop Multiplexing System for Integrated Service Digital Networks"; Conference: NTC '81, IEEE 1981 National Telecommunications Conference, Innovative Telecommunications—Key to the Future, Nov. 29-Dec. 3, 1981, New Orleans, Louisiana, pp. D5.1.1-D5.1.5.

G. Neumann; Flexible and Cost-Minimising System Concept (Ericsson Digital PABX MD 110), NET Nechrichten Elektronik—Telematik, Special Issue, Mar. 1988, p. 11, 12, 14, 15.

H. Nishi, et al., "Control of a Star/Bus Key Telephone System," NTT R & D, vol. 39, No. 8, 1990, pp. 122, 1222, 1224-1228.

A. Pietrasik, et al., "Subscriber Carrier Telephony System 1+1," Wiadomosci Telekomunikacyjne, vol. 17, No. 7-8, Jul.-Aug. 1977, pp. 183-198.

V. Punj, "Broadband Applications and Services of Public Switched Networks," IEEE Transactions on Consumer Electronics, vol. 35, No. 2, May 1989, pp. 106-112.

H. Tanaka, et al., "Telecontrol System VJ-501," National Technical Report, vol. 32, No. 6, Dec. 1986, pp. 809-817.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazaki, et al., "Home Appliance Technologies," NEC Research and Development, No. 96, Mar. 1990, pp. 292-299.

"CEBus: US Households are Being Networked," Funkschau, No. 9, Apr. 1989, pp. 45-47.

"Shared Services (Data/Voice Network)," Communications News, vol. 25, No. 11, Nov. 1988, pp. 46-47.

Artom, A. et al., "The Possible Use Of Customer Loop For New Services During The Transition From Analogue To Digital," Revue F.I.T.C.E., Mar.-Apr. 1981, vol. 20, No. 2, pp. 50-56.

Artom, A. et al., "Medium-Term Prospects for New Servies to the Telephone Customers," Conference Record, Jun. 14-18, 1981, Int'l Conf. On Communications, pp. 14.4.1-14.4-6, Denver, CO.

Hoe-Young Noh, "Home Automation," Korea Information Science Society Review, Apr. 1989, vol. 7 No. 2, pp. 40-44, Republic of Korea. (Translation Provided).

BELLCORE: Request For Information: Asymmetrical Digital Subscriber Line (ADSL) Systems That Support Simplex High-Bit-Rate Access and POTS In The Copper Loop Plant; Jun. 1991.

G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.

D.G.J. Fanshawe, "Architures for Home Systems", Conference: IEEE Colloquium on Home Systems—Information, Entertainment and Control, Oct. 1, 1990, London, United Kingdom, pp. 3/1-3/3.

M. Inoue, et al., "A Home Automation System", IEEE Transactions on Consumer Electronics, vol. CE-31, No. 3, Aug. 1985, pp. 516-527.

S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.

G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.

H. Nishi, et al., "Control of a Star/Bus Key Telephone System", NTT R & D, vol. 39, No. 8, 1990, pp. 122, 1222, 1224-1228.

A. Pietrasik, et al., "Subscriber Carrier Telephony System 1+1", Wiadomosci Telekomunikacyjne, vol. 17, No. 7-8, Jul.-Aug. 1977, pp. 183-198.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

T. Yamazakli, et al., "Home Appliance Technologies," NEC Research and Development, No. 96, Mar. 1990, pp. 292-299.

Funkschau, "CEBus: US Households are Being Networked", No. 9, Apr. 1989, pp. 45-47.

"Shared Services (Data/Voice Network)", Communications News, vol. 25, No. 11, Nov. 1988, pp. 46-47.

A. Artom, et al., "The Possible Use Of Customer Loop For New Services During The Transition From Analogue To Digital", Revue F.I.T.C.E., Mar.-Apr. 1981, vol. 20, No. 2, pp. 50-56.

A. Artom, et al., "Medium-Term Prospects for New Services to the Telephone Customers," Conference Record, Jun. 14-18, 1981, Int'l Conf. On Communications, Denver, CO., pp. 14.4.1-14.4-6.

Hoe-Young Noh, "Home Automation", Korea Information Science Society Review, Apr. 1989, vol. 7 No. 2, pp. 40-44, Republic of Korea. (Translation Provided).

English Language Abstract for Japanese Patent 1-27358 (64-27358) Jan. 30, 1989.

Twisted Pair Physical Layer and Medium Specification; Revision: IS-60 8-18-95 (49 pages).

Introduction to the CEBus Standard; Revision Feb. 5, 1995 Draft Copy (19 pages).

Compaq to Ride The CEBus; by Mark Hachman, EBN Jan. 22, 1996 (1 page).

CEBus Router Testing; IEEE Transactions on Consumer Electronics Nov. 1991, vol. 37 No. 4 (8 pages).

Broadband Network Technology—An Overview for the Data and Telecommunications Industries; by Edward Cooper, Copyright 1984, pp. 51-52 (4 pages).

Technical Report TR-001 ADSL Forum System Reference Model; May 1996 (6 pages).

Ascend DSLPipe-S Features; Posted May 12, 1997 (2 pages).

Broadband Digital Subscriber Line—A Full Service Network for the Copper Plant; Telephony / Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages (s), None. cited by other.

"Home Phoneline Networking Alliance", Interface Specification for HomePNA 2.0 10M8 Technology Link Layer Protocol, (Dec. 1, 1999), pp. 1-39.

"Home Phoneline Networking Alliance", Interface Specification for HomePNA 2.0 10M8 Technology, (Dec. 1, 1999), pp. 1-77.

Paola Bisaglia, et al., Receiver Architectures for HomePNA 2.0 , Hewlett Packard Laboratories, Bristol, U.K., Oct. 17, 2001.

Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International Symposium; pp. 861-866 vol. 2.

Phoneline / HPNA / HomePNA Networks, http://www.homenethelp.com/web/howto/HomeNet-HPNA.asp (visited Jul. 29, 2003) (3 pages).

Anonymous, HomePNA Specification 1.0 Field Tests Status, Mar. 1999, Home Phoneline Networking Alliance, Inc, pp. 1-6.

Simple, High-Speed Ethernet Technology For The Home, White Paper, Home Phoneline Networking Alliance, Jun. 1998, pp. 1-11.

Information on Home PhoneLine Networking Alliance (Home PNA), dated Jun. 1998 and before.

IS-60.04; Node Communications Protocol Part 6: Application Layer Specification; Revision Apr. 18, 1996 (129 pages).

Strassberg, Dan; "Home Automation Buses: Protocols Really Hit Home"; EDN Design Feature, Apr. 13, 1995 (9 pages).

Hachman, Mark; "Compaq to Ride The CEBus"; EBN Jan. 22, 1996 (1 page).

Markwalter, Brain et al; "CEBus Router Testing"; IEEE Transactions on Consumer Electronics Nov. 1991, vol. 37 No. 4 (8 pages).

EIA-600.32 Twisted Pair physical Layer and Medium Specification; Revision: IS-60 Aug. 18, 1995 (49 pages).

EIA-600.10 Introduction to the CEBus Standard; revision Feb. 5, 1995 Draft Copy (19 pages).

Broadband digital subscriber line—A full service network for the copper plant; Telephony / Jun. 12, 1995, vol. 228 No. 24 (8 pages).

Amodei, Aurelio et al.; "Increasing the Throughput of the HomePNA MAC Protocol"; IEEE, Proceedings of the 29th Annual IEEE International Conference on Local Computer Networks (LCN '04), 8 Pages, Nov. 1, 2004.

"Home Phoneline Networking Alliance", Interface Specification for HomePNA 2.0 10M8 Technology Link Layer Protocol, (Dec. 1, 1999), 1-39.

"Home Phoneline Networking Alliance", Interface Specification for HomePNA 2.0 10M8 Technology, (Dec. 1, 1999), 1-77.

Bisaglia, Paola, et al.; Receiver Architectures for HomePNA 2.0; Hewlett Packard Laboratories, Bristol, U.K., Oct. 17, 2001.

G. D. Carse; "New and Future Technologies in the Local Telephone Network: The Victoria System"; Conference: IEEE International Conference on Communications '86, ICC '86: Integrating the World Through Communications Conference Record, Jun. 22-25, 1986, Toronto, Ontario, Canada, pp. 410-412.

D.G.J. Fanshawe; "Architures for Home Systems"; Conference: IEEE Colloquium on Home Systems—Information, Entertainment and Control, Oct. 1, 1990, London, United Kingdom, pp. 3/1-3/3.

AN1000EVK Evaluation Unit Manual, Draft 1.0; Adaptive Networks Inc., Document No. 04-3170-01-B Aug. 1996 (31 pages).

From the Ether—Bob Metcalfe, 'Cheap, reliable net connections may be as close as an electrical socket'; by Bob Metcalfe Info World Feb. 10, 1997 vol. 19 Issue 6 (4 pages).

Lon Works Custom Node Development, Lon Works Engineering Bulletin; Echelon Corporation, Jan. 1995 (16 pages).

Building a Lon Talk-to-PLC Gateway, Lon Works Engineering Bulletin; Echelon Corporation, May 1994 (62 pages).

Lon Works 78kbps Self-Healing Ring Architecture, Lon Works Marketing Bulletin; Echelon Corporation, Aug. 1993 (6 pages).

Centralized Commercial Building Applications with the Lon Works PLT-21 Power Line Transceiver, Lon Works Engineering Bulletin; Echelon Corporation, Apr. 1997 (22 pages).

Lon Works for Audio Computer Control Network Applications; Echelon Corporation, Jan. 1995 (30 pages).

Demand Side Management with Lon Works Power Line Transceivers, Lon Works Engineering Bulletin; Echelon Corporation, Dec. 1996 (36 pages).

'Switching Hubs—Switching to the Fast Track', by Gary Gunnerson, PC Magazine, Oct. 11, 1994 (24 pages).

VISPLAN- 10 Infrared Wireless LAN system; JVC May 1996 (10 pages).

'JVC Introduces Ethernet Compatible Wireless LAN System'; Business Wire Sep. 26, 1995 (1 page).

Ethernet Wireless LAN Systems; BYTE Feb. 1996 (3 pages).

'JVC Introduces First Ethernet Compatible Wireless LAN System'; Business Wire Nov. 8, 1995 (1 page).

Intelogis to Present on Stage at Internet Showcase 1998; PR Newswire Jan. 28, 1998 (1 page).

* cited by examiner

NETWORK FOR TELEPHONY AND DATA COMMUNICATION

CROSS-REFERENCE TO RELATED APPLICATIONS

This is a continuation of copending U.S. application Ser. No. 11/020,193, filed Dec. 27, 2004, itself a continuation of U.S. application Ser. No. 10/773,247, filed on Feb. 9, 2004, which is itself a continuation of U.S. application Ser. No. 09/357,379, filed on Jul. 20, 1999, now U.S. Pat. No. 6,690,677, all of which are incorporated herein by reference.

FIELD OF THE INVENTION

The present invention relates to the field of wired communication systems, and, more specifically, to the networking of devices using telephone lines.

BACKGROUND OF THE INVENTION

FIG. 1 shows the wiring configuration for a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, apparatus which establishes and enables telephony from one telephone to another. The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone device" herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new telephone outlets in the home. A plurality of telephones 13a, 13b, and 13c connects to telephone line 5 via a plurality of outlets 11a, 11b, 11c, and 11d. Each outlet has a connector (often referred to as a "jack"), denoted in FIG. 1 as 12a, 12b, 12c, and 12d, respectively. Each outlet may be connected to a telephone via a connector (often referred to as a "plug"), denoted in FIG. 1 (for the three telephone illustrated) as 14a, 14b, and 14c, respectively. It is also important to note that lines 5a, 5b, 5c, 5d, and 5e are electrically the same paired conductors.

There is a requirement for using the existing telephone infrastructure for both telephone and data networking. This would simplify the task of establishing a new local area network in a home or other building, because there would be no additional wires and outlets to install. U.S. Pat. No. 4,766,402 to Crane (hereinafter referred to as "Crane") teaches a way to form a LAN over two wire telephone lines, but without the telephone service.

The concept of frequency domain/division multiplexing (FDM) is well-known in the art, and provides a means of splitting the bandwidth carried by a wire into a low-frequency band capable of carrying an analog telephony signal and a high-frequency band capable of carrying data communication or other signals. Such a mechanism is described for example in U.S. Pat. No. 4,785,448 to Reichert et al (hereinafter referred to as "Reichert"). Also is widely used are xDSL systems, primarily Asymmetric Digital Subscriber Loop (ADSL) systems.

Relevant prior art in this field is also disclosed in U.S. Pat. No. 5,896,443 to Dichter (hereinafter referred to as "Dichter"). Dichter is the first to suggest a method and apparatus for applying such a technique for residence telephone wiring, enabling simultaneously carrying telephone and data communication signals. The Dichter network is illustrated in FIG. 2, which shows a network 20 serving both telephones and a local area network. Data Terminal Equipment (DTE) units 24a, 24b and 24c are connected to the local area network via Data Communication Equipment (DCE) units 23a, 23b and 23c, respectively. Examples of Data Communication Equipment include modems, line drivers, line receivers, and transceivers. DCE units 23a, 23b and 23c are respectively connected to high pass filters (HPF) 22a, 22b and 22c. The HPF's allow the DCE units access to the high-frequency band carried by telephone line 5. In a first embodiment (not shown in FIG. 2), telephones 13a, 13b and 13c are directly connected to telephone line 5 via connectors 14a, 14b and 14c, respectively. However, in order to avoid interference to the data network caused by the telephones, a second embodiment is suggested (shown in FIG. 2), wherein low pass filters (LPF's) 21a, 21b and 21c are added to isolate telephones 13a, 13b and 13c from telephone line 5. Furthermore, a low pass filter must also be connected to Junction-Box 16, in order to filter noises induced from or to the PSTN wiring 17. As is the case in FIG. 1, it is important to note that lines 5a, 5b, 5c, 5d and 5e are electrically the same paired conductors.

The Dichter network suffers from degraded data communication performance, because of the following drawbacks:

1. Induced noise in the band used by the data communication network is distributed throughout the network. The telephone line within a building serves as a long antenna, receiving electromagnetic noise produced from outside the building or by local equipment such as air-conditioning systems, appliances, and so forth. Electrical noise in the frequency band used by the data communication network can be induced in the extremities of the telephone line 5 (line 5e or 5a in FIG. 2) and propagated via the telephone line 5 throughout the whole system. This is liable to cause errors in the data transportation.

2. The wiring media consists of a single long wire (telephone line 5). In order to ensure a proper impedance match to this transmission-line, it is necessary to install terminators at each end of the telephone line 5. One of the advantages of using the telephone infrastructure for a data network, however, is to avoid replacing the internal wiring. Thus, either such terminators must be installed at additional cost, or suffer the performance problems associated with an impedance mismatch.

3. In the case where LPF 21 is not fitted to the telephones 13, each connected telephone appears as a non-terminated stub, and this is liable to cause undesirable signal reflections.

4. In one embodiment, an LPF 21 is to be attached to each telephone 13. In such a configuration, an additional modification to the telephone itself is required. This further makes the implementation of such system complex and costly, and defeats the purpose of using an existing telephone line and telephone sets 'as is' for a data network.

5. The data communication network used in the Dichter network supports only the 'bus' type of data communication network, wherein all devices share the same physical media. Such topology suffers from a number of drawbacks, as described in U.S. Pat. No. 5,841,360 to the present inventor, which is incorporated by reference for all purposes as if fully set forth herein. Dichter also discloses drawbacks of the bus topology, including the need for bus mastering and logic to contend with the data packet collision problem. Topologies that are preferable to the bus topology include the Token-Ring (IEEE 803), the PSIC network according to U.S. Pat. No. 5,841,360, and other point-to-point networks known in the art (such as a serial point-to-point 'daisy chain' network). Such networks are in most cases superior to 'bus' topology systems.

The above drawbacks affect the data communication performance of the Dichter network, and therefore limit the total distance and the maximum data rate such a network can support. In addition, the Dichter network typically requires a complex and therefore costly transceiver to support the data communication system. While the Reichert network relies on a star topology and does not suffer from these drawbacks of the bus topology, the star topology also has disadvantages. First, the star topology requires a complex and costly hub module, whose capacity limits the capacity of the network. Furthermore, the star configuration requires that there exist wiring from every device on the network to a central location, where the hub module is situated. This may be impractical and/or expensive to achieve, especially in the case where the wiring of an existing telephone system is to be utilized. The Reichert network is intended for use only in offices where a central telephone connection point already exists. Moreover, the Reichert network requires a separate telephone line for each separate telephone device, and this, too, may be impractical and/or expensive to achieve.

There is thus a widely-recognized need for, and it would be highly advantageous to have, a means for implementing a data communication network using existing telephone lines of arbitrary topology, which continues to support analog telephony while also allowing for improved communication characteristics by supporting a point-to-point topology network.

SUMMARY OF THE INVENTION

The present invention provides a method and apparatus for using the telephone line wiring system within residence or other building for both analog telephony service and a local area data network featuring a serial "daisy chained" or other arbitrary topology. First, the regular outlets are modified or substituted to allow splitting of the telephone line having two wires into segments such that each segment connecting two outlets is fully separated from all other segments. Each segment has two ends, to which various devices, other segments, and so forth, may be connected. A low pass filter is connected in series to each end of the segment, thereby forming a low-frequency path between the external ports of the low pass filters, utilizing the low-frequency band. Similarly, a high pass filter is connected in series to each end of the segment, thereby forming a high-frequency path between the external ports of the high pass filters, utilizing the high-frequency band. The bandwidth carried by the segments is thereby split into non-overlapping frequency bands, and the distinct paths can be interconnected via the high pass filters and low pass filters as coupling and isolating devices to form different paths. Depending on how the devices and paths are selectively connected, these paths may be simultaneously different for different frequencies. A low-frequency band is allocated to regular telephone service (analog telephony), while a high-frequency band is allocated to the data communication network. In the low-frequency (analog telephony) band, the wiring composed of the coupled low-frequency paths appears as a normal telephone line, in such a way that the low-frequency (analog telephony) band is coupled among all the segments and is accessible to telephone devices at any outlet, whereas the segments may remain individually isolated in the high-frequency (data) band, so that in this data band the communication media, if desired, can appear to be point-to-point (such as a serialized "daisy chain") from one outlet to the next. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

A network according to the present invention allows the telephone devices to be connected as in a normal telephone installation (i.e., in parallel over the telephone lines), but can be configured to virtually any desired topology for data transport and distribution, as determined by the available existing telephone line wiring and without being constrained to any predetermined data network topology. Moreover, such a network offers the potential for the improved data transport and distribution performance of a point-to-point network topology, while still allowing a bus-type data network topology in all or part of the network if desired. This is in contrast to the prior art, which constrains the network topology to a predetermined type.

A network according to the present invention may be used advantageously when connected to external systems and networks, such as xDSL, ADSL, as well as the Internet.

In a first embodiment, the high pass filters are connected in such a way to create a virtual 'bus' topology for the high-frequency band, allowing for a local area network based on DCE units or transceivers connected to the segments via the high pass filters. In a second embodiment, each segment end is connected to a dedicated modem, hence offering a serial point-to-point daisy chain network. In all embodiments of the present invention, DTE units or other devices connected to the DCE units can communicate over the telephone line without interfering with, or being affected by, simultaneous analog telephony service. Unlike prior-art networks, the topology of a network according to the present invention is not constrained to a particular network topology determined in advance, but can be adapted to the configuration of an existing telephone line installation. Moreover, embodiments of the present invention that feature point-to-point data network topologies exhibit the superior performance characteristics that such topologies offer over the bus network topologies of the prior art, such as the Dichter network and the Crane network.

Therefore, according to the present invention there is provided a network for telephony and data communication including: (a) at least one electrically-conductive segment containing at least two distinct electrical conductors operative to conducting a low-frequency telephony band and at least one high-frequency data band, each of the segments having a respective first end and a respective second end; (b) a first low pass filter connected in series to the respective first end of each of the segments, for establishing a low-frequency path for the low-frequency telephony band; (c) a second low pass filter connected in series to the respective second end of each of the segments, for establishing a low-frequency path for the low-frequency telephony band; (d) a first high pass filter connected in series to the respective first end of each of the segments, for establishing a high-frequency path for the at least one high-frequency data band; (e) a second high pass filter connected in series to the respective second end of each of the segments, for establishing a high-frequency path for the at least one high-frequency data band; and (f) at least two outlets each operative to connecting at least one telephone device to at least one of the low-frequency paths, and at least two of the at least two outlets being operative to connecting at least one data device to at least one of the high-frequency paths; wherein each of the segments electrically connects two of the outlets; and each of the outlets that is connected to more than one of the segments couples the low-frequency telephony band among each of the connected segments.

BRIEF DESCRIPTION OF THE DRAWINGS

In order to understand the invention and to see how the same may be carried out in practice, some preferred embodiments will now be described, by way of non-limiting example only, with reference to the accompanying drawings, wherein.

DESCRIPTION OF THE PREFERRED EMBODIMENTS

Figure 1:
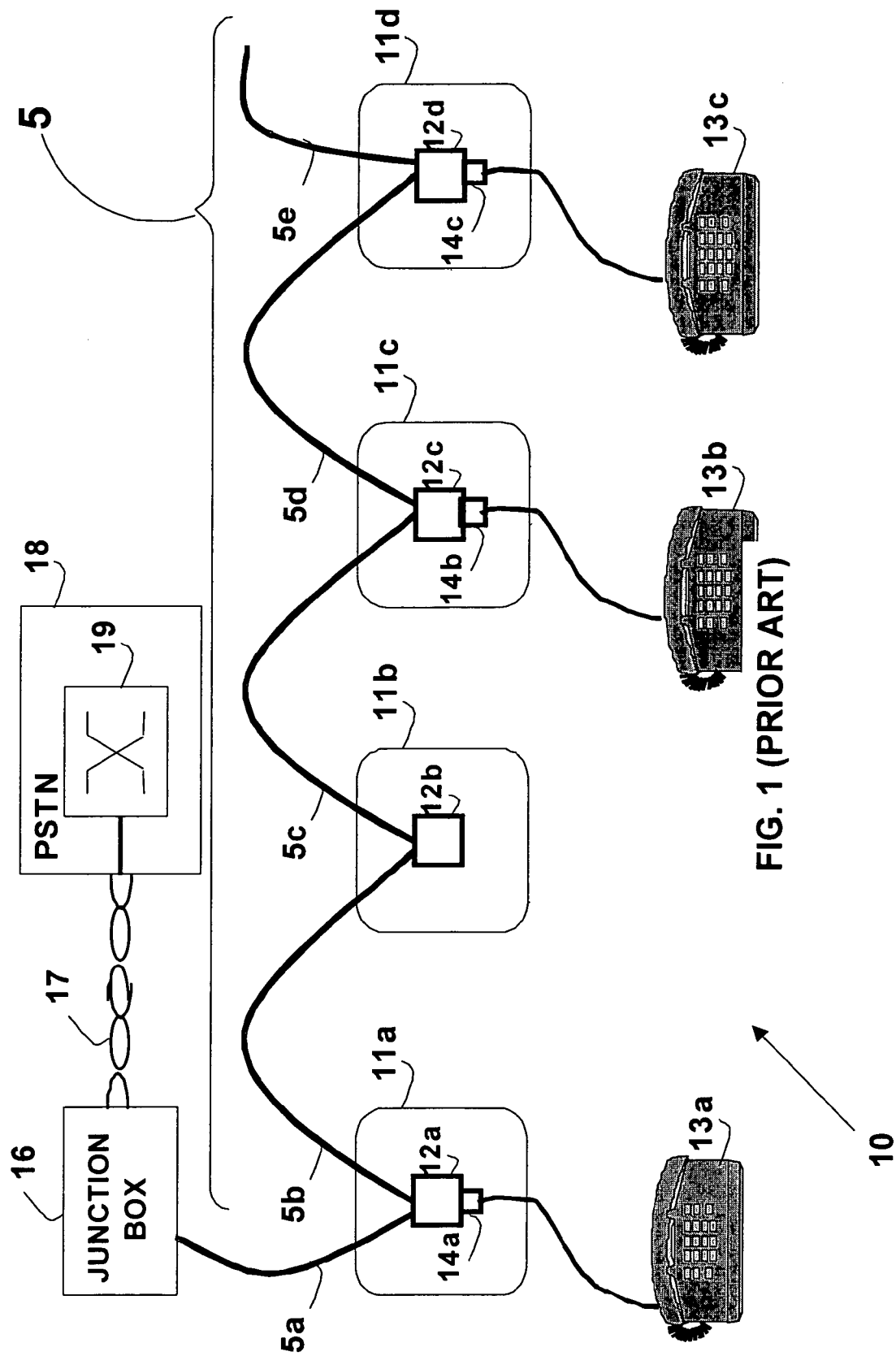
FIG. 1 shows a common prior art telephone line wiring configuration for a residence or other building.
Figure 2:
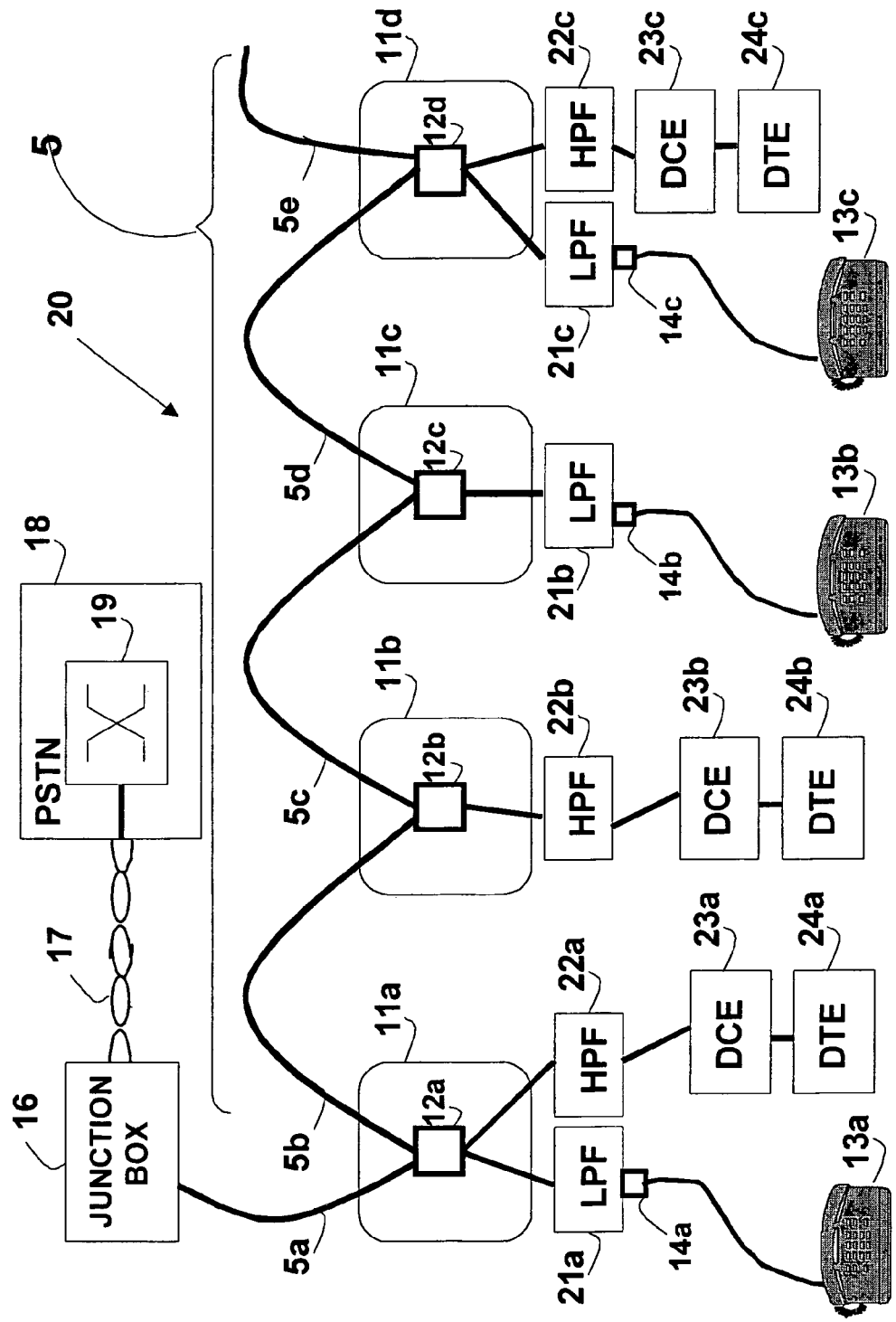
FIG. 2 shows a prior art local area network based on telephone line wiring for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 3:
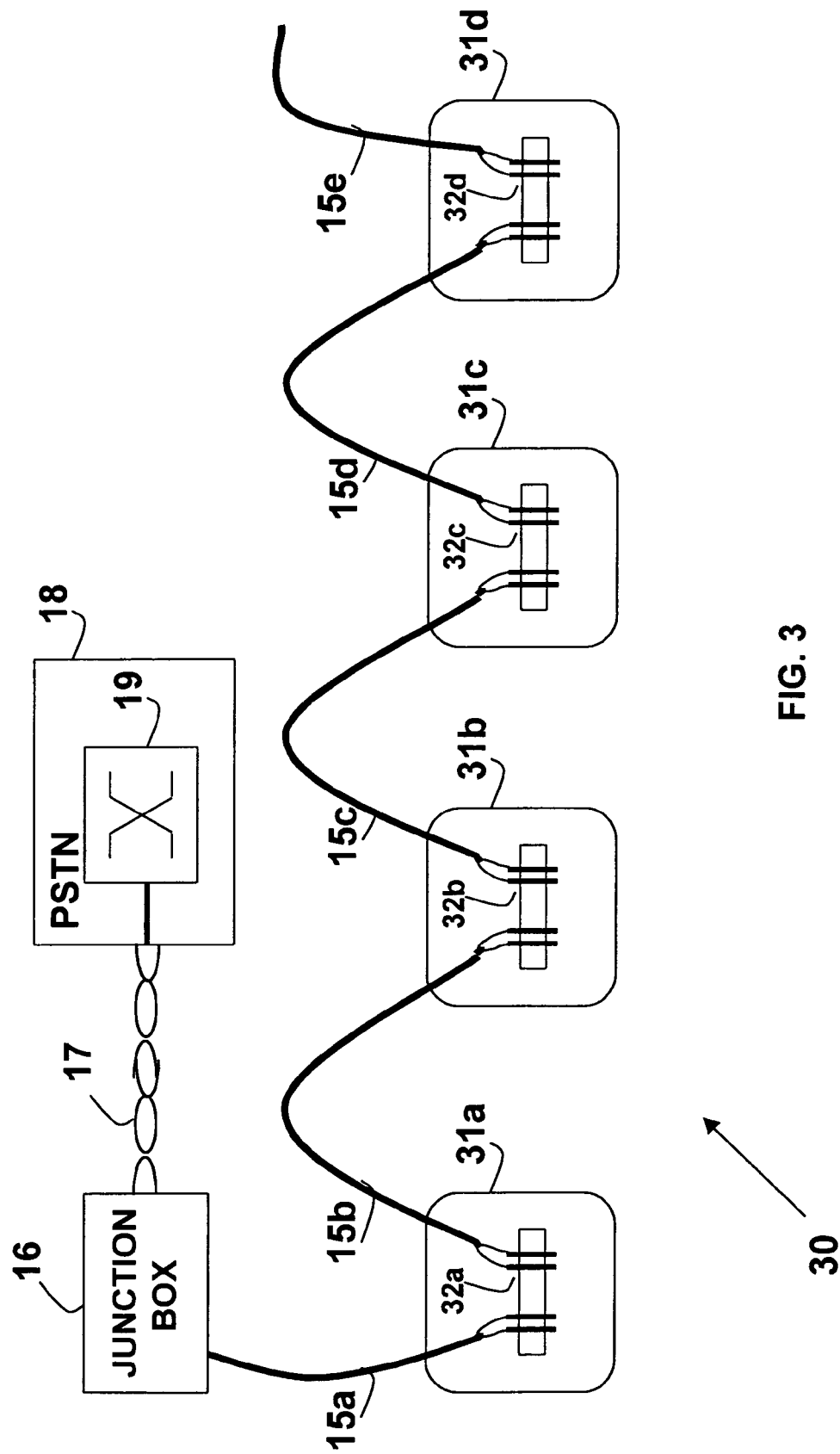
FIG. 3 shows modifications to telephone line wiring according to the present invention for a local area network.

The basic concept of the invention is shown in FIG. 3. A network 30 is based on modified telephone outlets 31a, 31b, 31c and 31d. The modification relates to wiring changes at the outlets and substituting the telephone connectors, shown as connectors 32a, 32b, 32c and 32d in outlets 31a, 31b, 31c and 31d respectively. No changes are required in the overall telephone line layout or configuration. The wiring is changed by separating the wires at each outlet into distinct segments of electrically-conducting media. Thus, each segment connecting two outlets can be individually accessed from either end. In the prior art Dichter network, the telephone wiring is not changed, and is continuously conductive from junction box 16 throughout the system. According to the present invention, the telephone line is broken into electrically distinct isolated segments 15a, 15b, 15c, 15d and 15e, each of which connects two outlets. In order to fully access the media, each of connectors 32a, 32b, 32c and 32d must support four connections, two in each segment. This modification to the telephone line can be carried out by replacing each of the outlets 31a, 31b, 31c and 31d, replacing only the connectors 32a, 32b, 32c and 32d, or simply by cutting the telephone line wiring at the outlet. As will be explained later, these modifications need be performed only to those outlets which connect to data network devices, but are recommended at all other outlets. A minimum of two outlets must be modified, enabling data communication between those outlets only.

Figure 4:
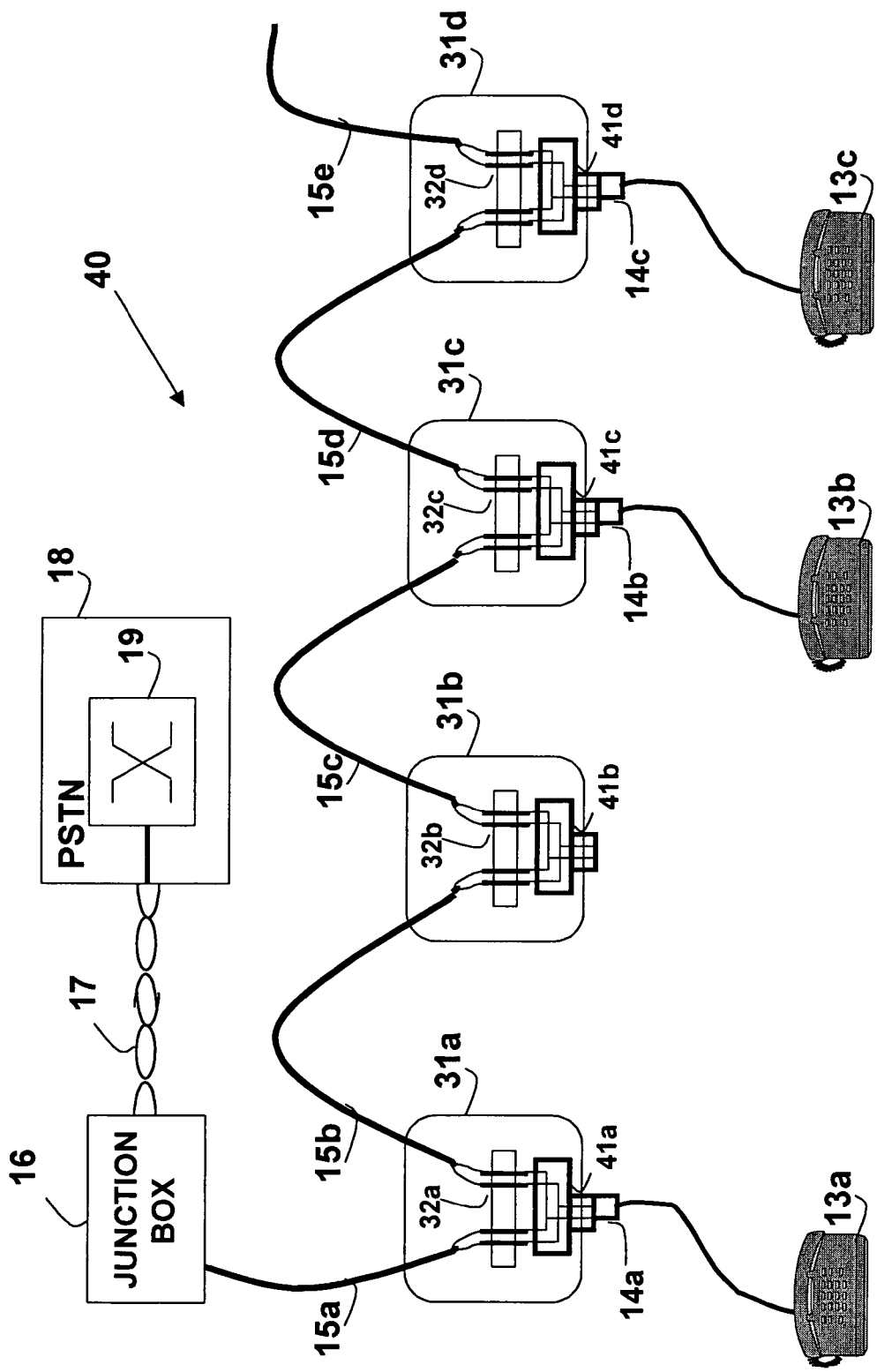
FIG. 4 shows modifications to telephone line wiring according to the present invention, to support regular telephone service operation.

FIG. 4 shows how a network 40 of the present invention continues to support the regular telephone service, by the installation of jumpers 41a, 41b, 41c and 41d in modified outlets 31a, 31b, 31c and 31d respectively. At each outlet where they are installed, the jumpers connect both segment ends and allow telephone connection to the combined segment. Installation of a jumper effects a re-connection of the split telephone line at the point of installation. Installation of jumpers at all outlets would reconstruct the prior art telephone line configuration as shown in FIG. 1. Such jumpers can be add-ons to the outlets, integrated within the outlets, or integrated into a separate module. Alternately, a jumper can be integrated within a telephone set, as part of connector 14. The term "jumper" herein denotes any device for selectively coupling or isolating the distinct segments in a way that is not specific to the frequency band of the coupled or isolated signals. Jumper 41 can be implemented with a simple electrical connection between the connection points of connector 32 and the external connection of the telephone.

As described above, jumpers 41 are to be installed in all outlets which are not required for connection to the data communication network. Those outlets which are required to support data communication connections, however, will not use jumper 41 but rather a splitter 50, shown in FIG. 5. Such a splitter connects to both segments in each modified outlet 31 via connector 32, using a port 54 for a first connection and a port 55 for a second connection. Splitter 50 has two LPF's for maintaining the continuity of the audio/telephone low-frequency band. After low pass filtering by LPF 51a for the port 54 and LPF 51b for port 55, the analog telephony signals are connected together and connected to a telephone connector 53. Hence, from the point of view of the telephone signal, the splitter 50 provides the same continuity and telephone access provided by the jumper 41. On the other hand, the data communication network employs the high-frequency band, access to which is made via HPF's 52a and 52b. HPF 52a is connected to port 54 and HPF 52b is connected to port 55. The high pass filtered signals are not passed from port 54 to port 55, but are kept separate, and are routed to a connector 56 and a connector 57, respectively. The term "splitter" herein denotes any device for selectively coupling or isolating the distinct segments that is specific to the frequency band of the coupled or isolated signals.

Therefore, when installed in an outlet, the splitter 50 serves two functions. With respect to the low-frequency analog telephony band, splitter 50 establishes a coupling to effect the prior-art configuration shown in FIG. 1, wherein all telephone devices in the premises are connected virtually in parallel via the telephone line, as if the telephone line were not broken into segments. On the other hand, with respect to the high-frequency data communication network, splitter 50 establishes electrical isolation to effect the configuration shown in FIG. 3, wherein the segments are separated, and access to each segment end is provided by the outlets. With the use of splitters, the telephone system and the data communication network are actually decoupled, with each supporting a different topology.

Figure 6:
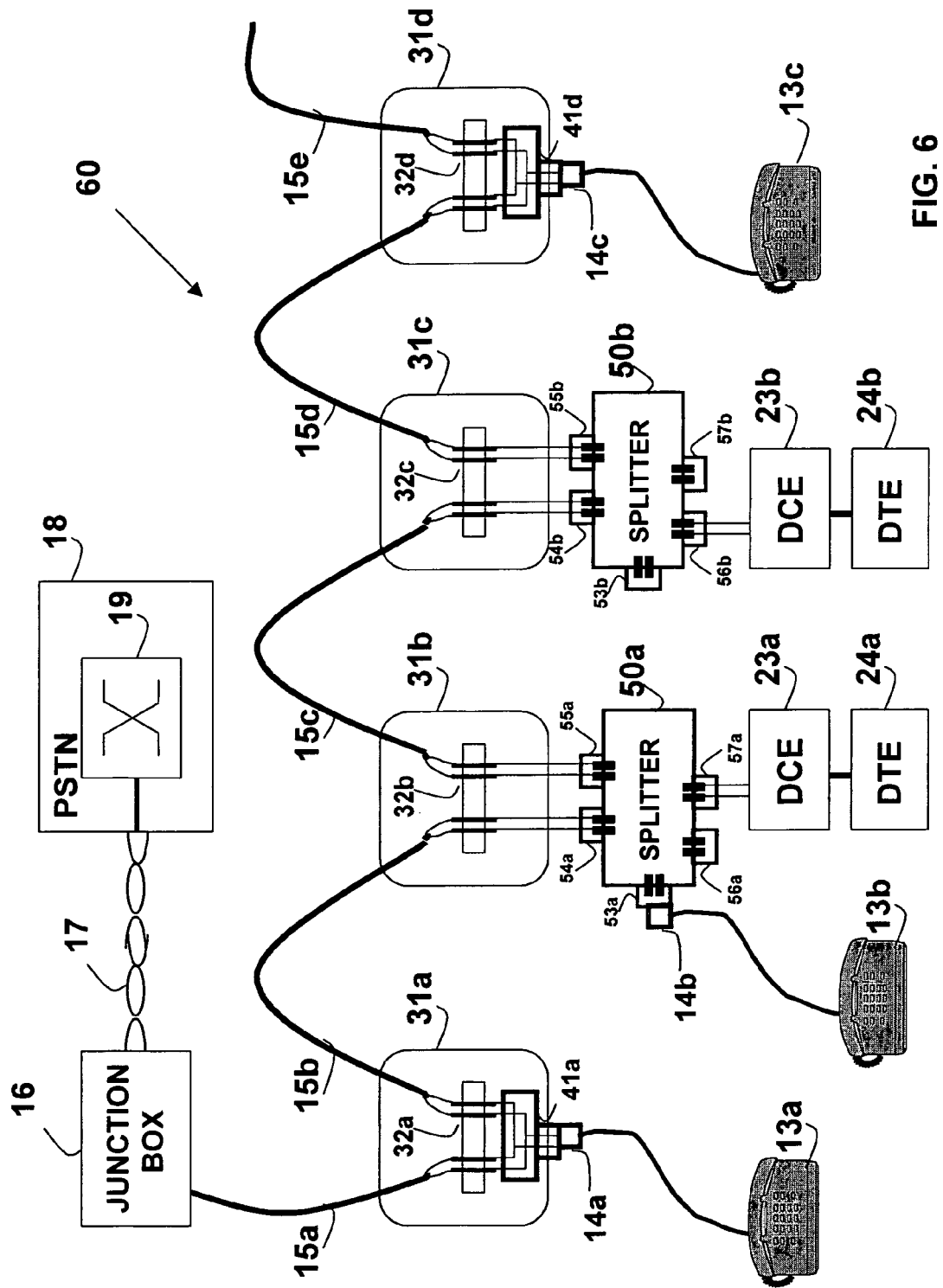
FIG. 6 shows a local area network based on telephone lines according to the present invention, wherein the network supports two devices at adjacent outlets.

FIG. 6 shows a first embodiment of a data communication network 60 between two DTE units 24a and 24b, connected to adjacent outlets 31b and 31c, which are connected together via a single segment 15c. Splitters 50a and 50b are connected to outlets 31b and 31c via connectors 32b and 32c, respectively. As explained above, the splitters allow transparent audio/telephone signal connection. Thus, for analog telephony, the telephone line remains virtually unchanged, allowing access to telephone external connection 17 via junction box 16 for telephones 13a and 13c. Likewise, telephone 13b connected via connector 14b to a connector 53a on splitter 50a, is also connected to the telephone line. In a similar way, an additional telephone can be added to outlet 31c by connecting the telephone to connector 53b on splitter 50b. It should be clear that connecting a telephone to an outlet, either via jumper 41 or via splitter 50 does not affect the data communication network.

Figure 5:
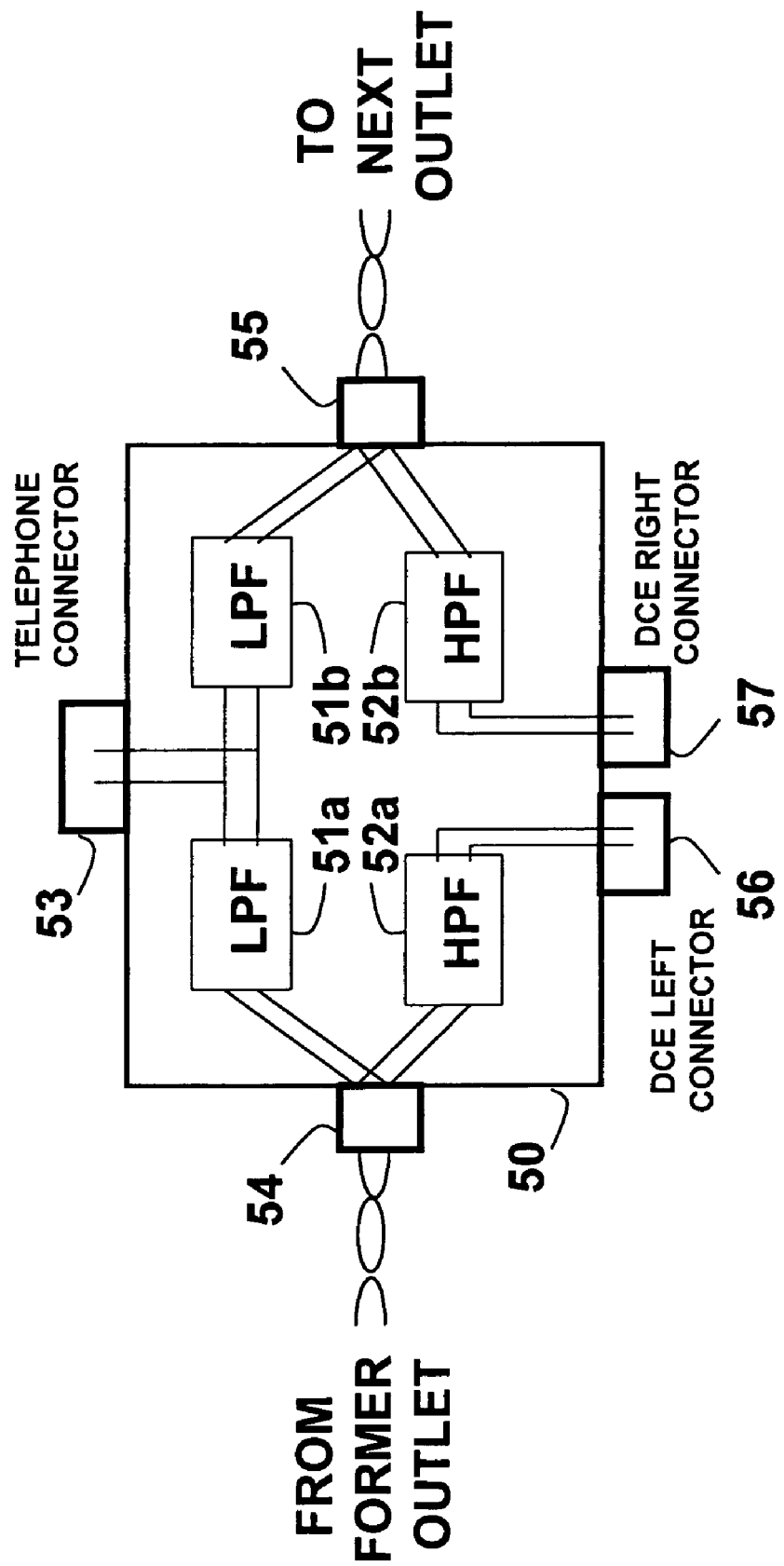
FIG. 5 shows a splitter according to the present invention.

Network 60 (FIG. 6) supports data communication by providing a communication path between port 57a of splitter 50a and port 56b of splitter 50b. Between these ports there exists a point-to-point connection for the high-frequency portion of the signal spectrum, as determined by HPF 52a and 52b within splitters 50 (FIG. 5). This path can be used to establish a communication link between DTE units 24a and 24b, by means of DCE units 23a and 23b, which are respectively connected to ports 57a and 56b. The communication between DTE units 24a and 24b can be unidirectional, half-duplex, or full-duplex. The only limitation imposed on the communication system is the capability to use the high-frequency portion of the spectrum of segment 15c. As an example, the implementation of data transmission over a telephone line point-to-point system described in Reichert can also be used in network 60. Reichert implements both LPF and HPF by means of a transformer with a capacitor connected in the center-tap, as is well known in the art. Similarly, splitter 50 can be easily implemented by two such circuits, one for each side.

It should also be apparent that HPF 52a in splitter 50a and HPF 52b in splitter 50b can be omitted, because neither port 56a in splitter 50a nor port 57b in splitter 50b is connected.

Network 60 provides clear advantages over the networks described in hitherto-proposed networks. First, the communication media supports point-to-point connections, which are known to be superior to multi-tap (bus) connections for communication performance. In addition, terminators can be used within each splitter or DCE unit, providing a superior match to the transmission line characteristics. Furthermore, no taps (drops) exists in the media, thereby avoiding impedance matching problems and the reflections that result therefrom.

Moreover, the data communication system in network 60 is isolated from noises from both the network and the 'left' part of the telephone network (Segments 15a and 15b), as well as noises induced from the 'right' portion of the network (Segments 15d and 15e). Such isolation is not provided in any prior-art implementation. Dichter suggests installation of a low pass filter in the junction box, which is not a satisfactory solution since the junction box is usually owned by the telephone service provider and cannot always be accessed. Furthermore, safety issues such as isolation, lightning protection, power-cross and other issues are involved in such a modification.

Implementing splitter 50 by passive components only, such as two transformers and two center-tap capacitors, is also advantageous, since the reliability of the telephone service will not be degraded, even in the case of failure in any DCE unit, and furthermore requires no external power. This accommodates a 'life-line' function, which provides for continuous telephone service even in the event of other system malfunction (e.g. electrical failures).

The splitter 50 can be integrated into outlet 31. In such a case, outlets equipped with splitter 50 will have two types of connectors: One regular telephone connector based on port 53, and one or two connectors providing access to ports 56 and 57 (a single quadruple-circuit connector or two double-circuit connectors). Alternatively, splitter 50 can be an independent module attached as an add-on to outlet 31. In another embodiment, the splitter is included as part of DCE 23. However, in order for network 60 to operate properly, either jumper 41 or splitter 50 must be employed in outlet 31 as modified in order to split connector 32 according to the present invention, allowing the retaining of regular telephone service.

Figure 7:
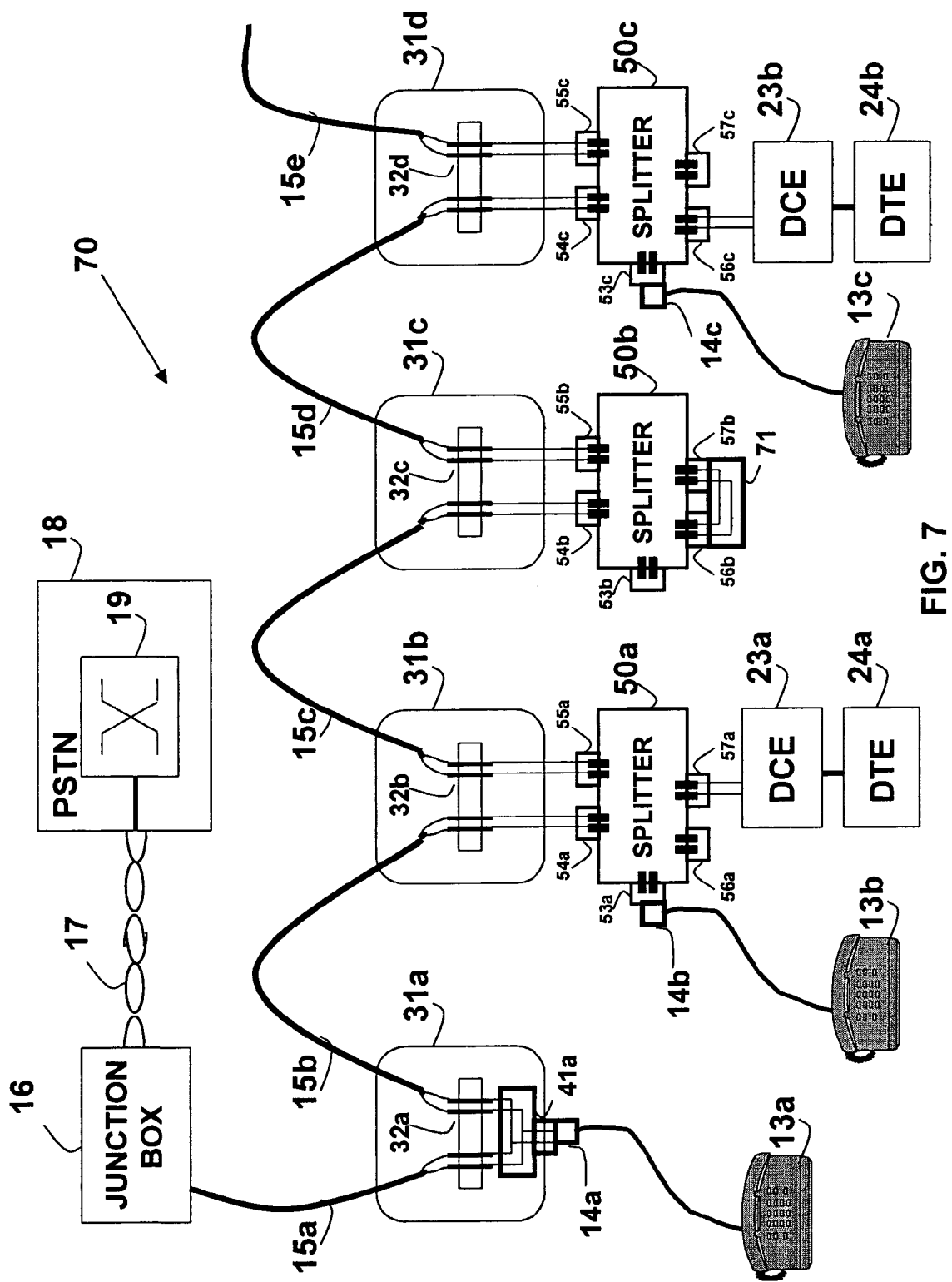
FIG. 7 shows a first embodiment of a local area network based on telephone lines according to the present invention, wherein the network supports two devices at non-adjacent outlets.

FIG. 7 also shows data communication between two DTE units 24a and 24b in a network 70. However, in the case of network 70, DTE units 24a and 24b are located at outlets 31b and 31d, which are not directly connected, but have an additional outlet 31c interposed therebetween. Outlet 31c is connected to outlet 31b via a segment 15c, and to outlet 31d via a segment 15d.

In one embodiment of network 70, a jumper (not shown, but similar to jumper 41 in FIG. 4) is connected to a connector 32c in outlet 31c. The previous discussion regarding the splitting of the signal spectrum also applies here, and allows for data transport between DTE units 24a and 24b via the high-frequency portion of the spectrum across segments 15c and 15d. When only jumper 41 is connected at outlet 31c, the same point-to-point performance as previously discussed can be expected; the only influence on communication performance is from the addition of segment 15d, which extends the length of the media and hence leads to increased signal attenuation. Some degradation, however, can also be expected when a telephone is connected to jumper 41 at outlet 31c. Such degradation can be the result of noise produced by the telephone in the high-frequency data communication band, as well as the result of the addition of a tap caused by the telephone connection, which usually has a non-matched termination. Those problems can be overcome by installing a low pass filter in the telephone.

In a preferred embodiment of network 70, a splitter 50b is installed in outlet 31c. Splitter 50b provides the LPF functionality, and allows for connecting a telephone via connector 53b. However, in order to allow for continuity in data communication, there must be a connection between the circuits in connectors 56b and 57b. Such a connection is obtained by a jumper 71, as shown in FIG. 7. Installation of splitter 50b and jumper 71 provides good communication performance, similar to network 60 (FIG. 6). From this discussion of a system wherein there is only one unused outlet between the outlets to which the DTE units are connected, it should be clear that the any number of unused outlets between the outlets to which the DTE units are connected can be handled in the same manner.

Figure 8:
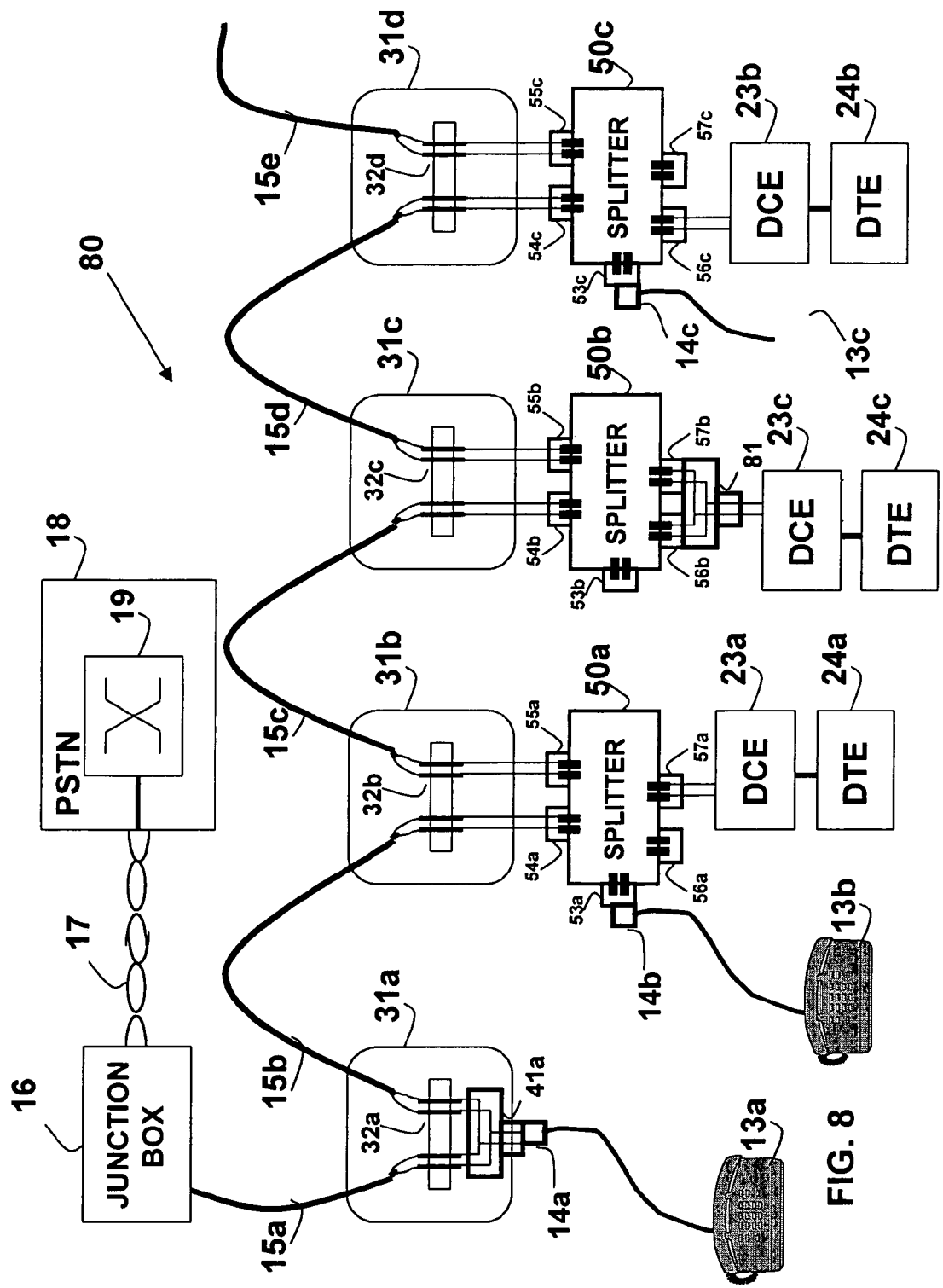
FIG. 8 shows a second embodiment of a local area network based on telephone lines according to the present invention, wherein the network supports three devices at adjacent outlets.

For the purpose of the foregoing discussions, only two communicating DTE units have been described. However, the present invention can be easily applied to any number of DTE units. FIG. 8 illustrates a network 80 supporting three DTE units 24a, 24b and 24c, connected thereto via DCE units 23a, 23b and 23c, respectively. The structure of network 80 is the same as that of network 70 (FIG. 7), with the exception of the substitution of jumper 71 with a jumper 81. Jumper 81 makes a connection between ports 56b and 57b in the same way as does jumper 71. However, in a manner similar to that of jumper 41 (FIG. 4), jumper 81 further allows for an external connection to the joined circuits, allowing the connection of external unit, such as a DCE unit 23c. In this way, segments 15c and 15d appear electrically-connected for high-frequency signals, and constitute media for a data communication network connecting DTE units 24a, 24b and 24c. Obviously, this configuration can be adapted to any number of outlets and DTE units. In fact, any data communication network which supports a 'bus' or multi-point connection over two-conductor media, and which also makes use of the higher-frequency part of the spectrum can be used. In addition, the discussion and techniques explained in the Dichter patent are equally applicable here. Some networks, such as Ethernet IEEE 802.3 interface 10BaseT and 100BaseTX, require a four-conductor connection, two conductors (usually single twisted-wire pair) for transmitting, and two conductors (usually another twisted-wire pair) for receiving. As is known in the art, a four-to-two wires converter (commonly known as hybrid) can be used to convert the four wires required into two, thereby allowing network data transport over telephone lines according to the present invention.

As with jumper 41 (FIG. 4), jumper 81 can be an integral part of splitter 50, an integral part of DCE 23, or a separate component.

In order to simplify the installation and operation of a network, it is beneficial to use the same equipment in all parts of the network. One such embodiment supporting this approach is shown in for a set of three similar outlets in FIG. 8, illustrating network 80. In network 80, outlets 31b, 31c, and 31d are similar and are all used as part of the data communication network. Therefore for uniformity, these outlets are all coupled to splitters 50a, 50b, and 50c respectively, to which jumpers are attached, such as a jumper 81 attached to splitter 50b (the corresponding jumpers attached to splitter 50a and splitter 50c have been omitted from FIG. 8 for clarity), and thus provide connections to local DCE units 23a, 23c, and 23b, respectively. In a preferred embodiment of the present invention, all outlets in the building will be modified to include both splitter 50 and jumper 81 functionalities. Each such outlet will provide two connectors: one connector coupled to port 53 for a telephone connection, and the other connector coupled to jumper 81 for a DCE connection.

In yet another embodiment, DCE 23 and splitter 50 are integrated into the housing of outlet 31, thereby offering a direct DTE connection. In a preferred embodiment, a standard DTE interface is employed.

Figure 9:
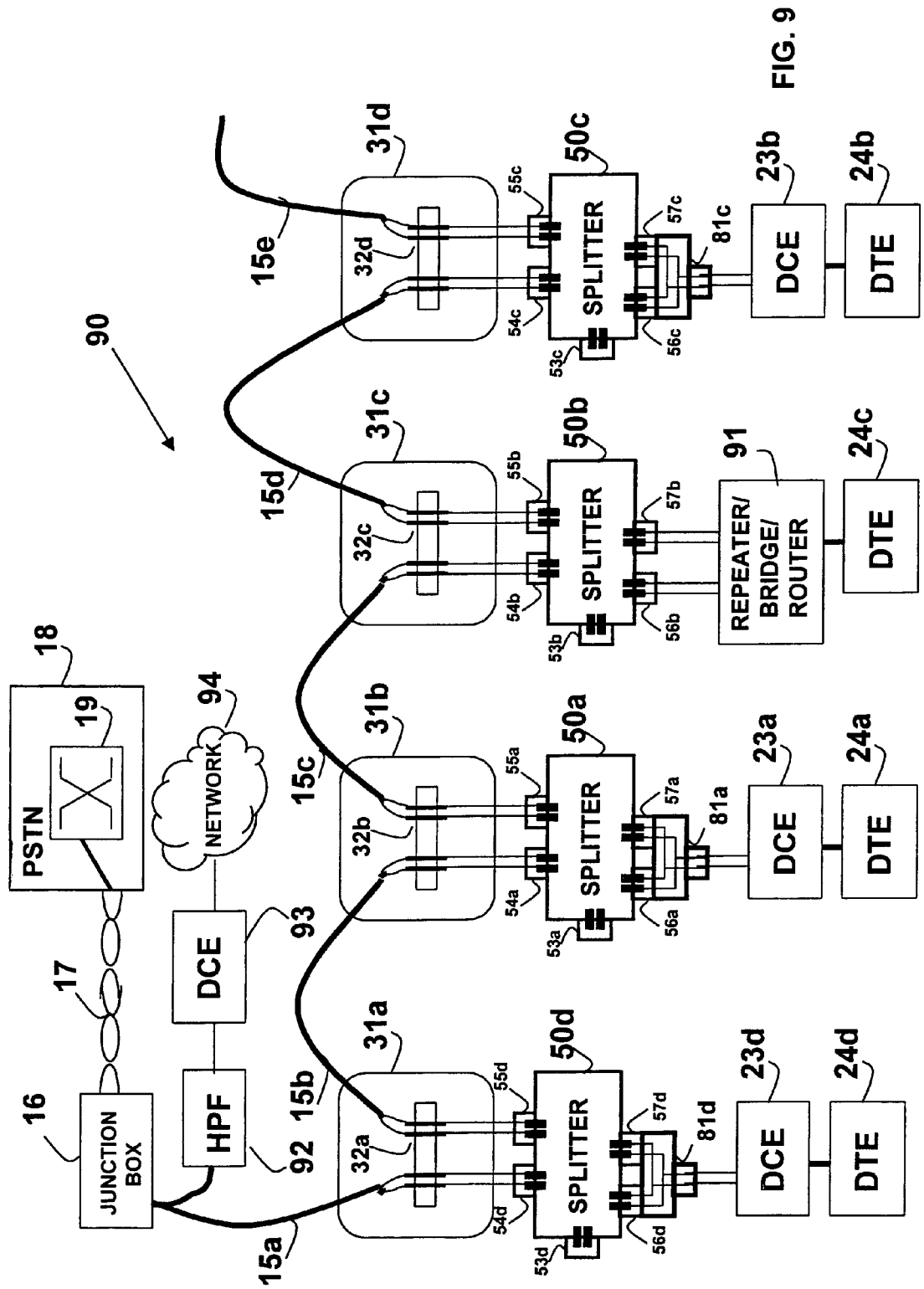
FIG. 9 shows third embodiment of a local area network based on telephone lines according to the present invention, wherein the network is a bus type network.

In most 'bus' type networks, it is occasionally required to split the network into sections, and connect the sections via repeaters (to compensate for long cabling), via bridges (to decouple each section from the others), or via routers. This may also be done according to the present invention, as illustrated in FIG. 9 for a network 90, which employs a repeater/bridge/router unit 91. Unit 91 can perform repeating, bridging, routing, or any other function associated with a split between two or more networks. As illustrated, a splitter 50b is coupled to an outlet 31c, in a manner similar to the other outlets and splitters of network 90. However, at splitter 50b, no jumper is employed. Instead, a repeater/bridge/router unit 91 is connected between port 56b and port 57b, thereby providing a connection between separate parts of network 90. Optionally, unit 91 can also provide an interface to DTE 24c for access to network 90.

FIG. 9 also demonstrates the capability of connecting to external DTE units or networks, via a high pass filter 92 connected to a line 15a. Alternatively, HPF 92 can be installed in junction box 16. HPF 92 allows for additional external units to access network 90. As shown in FIG. 9, HPF 92 is coupled to a DCE unit 93, which in turn is connected to a network 94. In this configuration, the local data communication network in the building becomes part of network 94. In one embodiment, network 94 offers ADSL service, thereby allowing the DTE units 24d, 24a, 24c and 24b within the building to communicate with the ADSL network. The capability of communicating with external DTE units or networks is equally applicable to all other embodiments of the present invention, but for clarity is omitted from the other drawings.

Figure 10:
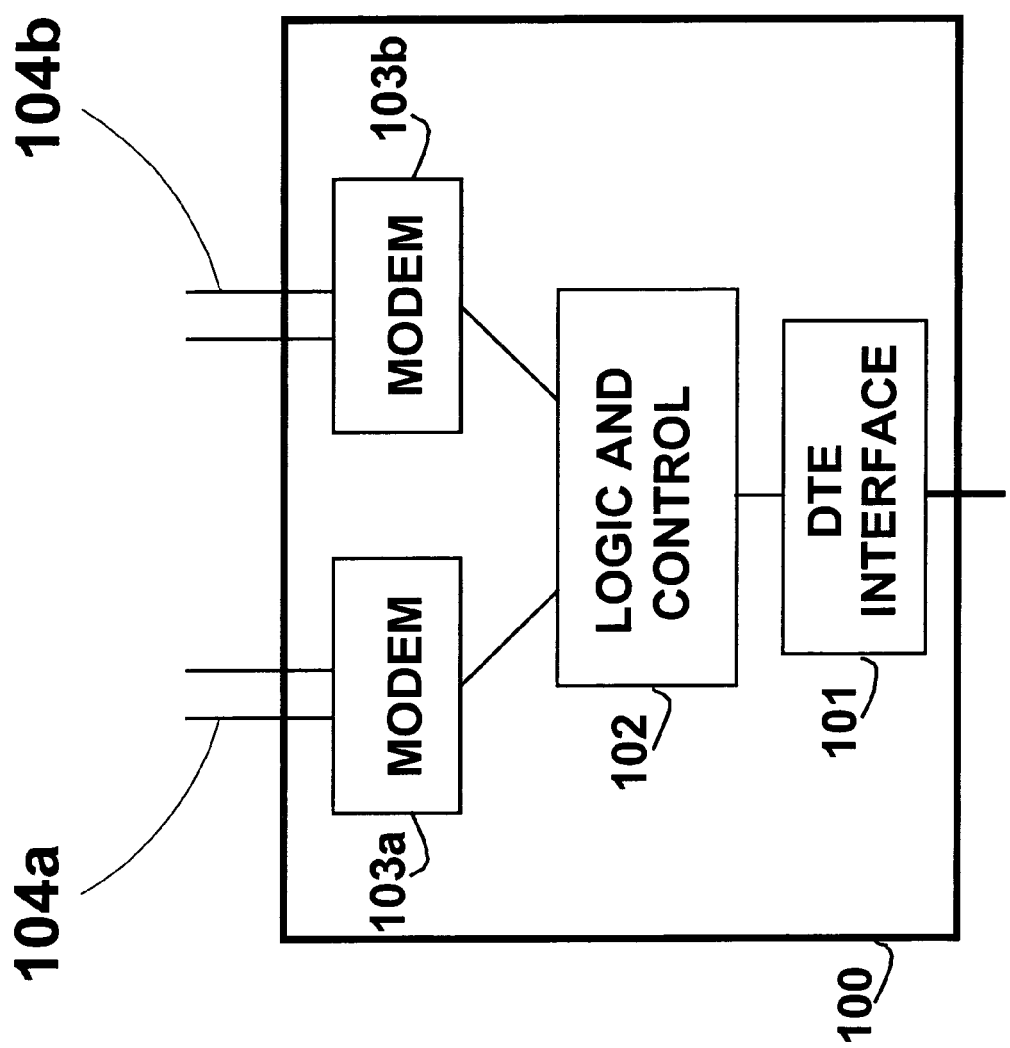
FIG. 10 shows a node of local area network based on telephone lines according to the present invention.

While the foregoing relates to data communication networks employing bus topology, the present invention can also support networks where the physical layer is distinct within each communication link. Such a network can be a Token-Passing or Token-Ring network according to IEEE 802, or preferably a PSIC network as described in U.S. Pat. No. 5,841,360 to the present inventor, which details the advantages of such a topology. FIG. 10 illustrates a node 100 for implementing such a network. Node 100 employs two modems 103a and 103b, which handle the communication physical layer. Modems 103a and 103b are independent, and couple to dedicated communication links 104a and 104b, respectively. Node 100 also features a DTE interface 101 for connecting to a DTE unit (not shown). A control and logic unit 102 manages the higher OSI layers of the data communication above the physical layer, processing the data to and from a connected DTE and handling the network control. Detailed discussion about such node 100 and the functioning thereof can be found in U.S. Pat. No. 5,841,360 and other sources known in the art.

Figure 11:
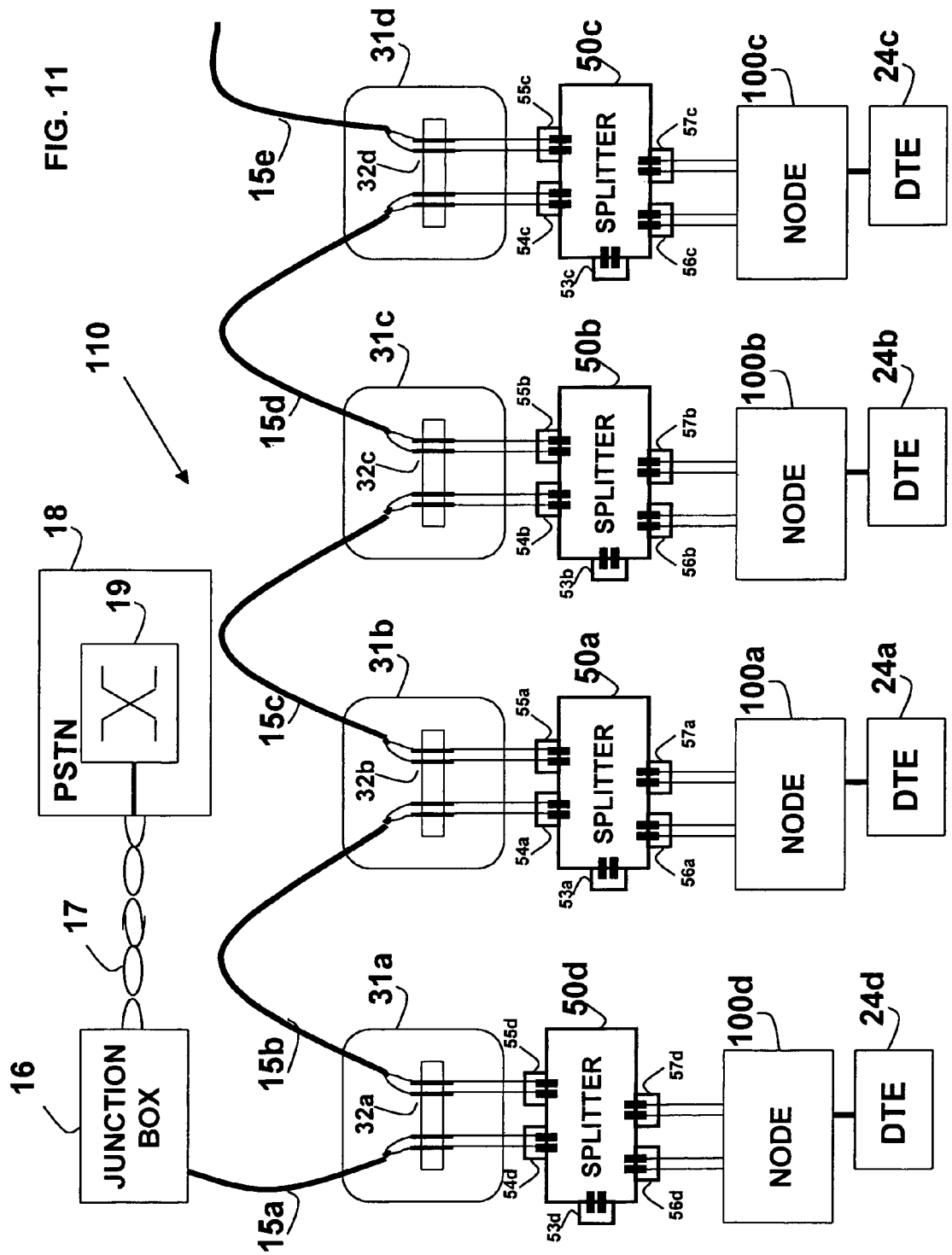
FIG. 11 shows a fourth embodiment of a local area network based on telephone lines according to the present invention.

FIG. 11 describes a network 110 containing nodes 100d, 100a, 100b and 100c coupled directly to splitters 50d, 50a, 50b and 50c, which in turn are coupled to outlets 31a, 31b, 31c and 31d respectively. Each node 100 has access to the corresponding splitter 50 via two pairs of contacts, one of which is to connector 56 and the other of which is to connector 57. In this way, for example, node 100a has independent access to both segment 15b and segment 15c. This arrangement allows building a network connecting DTE units 24d, 24a, 24b and 24c via nodes 100d, 100a, 100b and 100c, respectively.

For clarity, telephones are omitted from FIGS. 9 and 11, but it will be clear that telephones can be connected or removed without affecting the data communication network. Telephones can be connected as required via connectors 53 of splitters 50. In general, according to the present invention, a telephone can be connected without any modifications either to a splitter 50 (as in FIG. 8) or to a jumper 41 (as in FIG. 4).

Furthermore, although the present invention has so far been described with a single DTE connected to a single outlet, multiple DTE units can be connected to an outlet, as long as the corresponding node or DCE supports the requisite number of connections. Moreover, access to the communication media can be available for plurality of users using multiplexing techniques known in the art. In the case of time domain/division multiplexing (TDM) the whole bandwidth is dedicated to a specific user during a given time interval. In the case of frequency domain/division multiplexing (FDM), a number of users can share the media simultaneously, each using different non-overlapping portions of the frequency spectrum.

In addition to the described data communication purposes, a network according to the present invention can be used for control (e.g. home automation), sensing, audio, or video applications, and the communication can also utilize analog signals (herein denoted by the term "analog communication"). For example, a video signal can be transmitted in analog form via the network.

While the present invention has been described in terms of outlets which have only two connections and therefore can connect only to two other outlets (i.e., in a serial, or "daisy chain" configuration), the concept can also be extended to three or more connections. In such a case, each additional connecting telephone line must be broken at the outlet, with connections made to the conductors thereof, in the same manner as has been described and illustrated for two segments. A splitter for such a multi-segment application should use one low pass filter and one high pass filter for each segment connection.

The present invention has also been described in terms of media having a single pair of wires, but can also be applied for more conductors. For example, ISDN employs two pairs for communication. Each pair can be used individually for a data communication network as described above.

Also as explained above, an outlet 31 according to the invention (FIG. 3) has a connector 32 having at least four connection points. As an option, jumper 41 (FIG. 4), splitter 50 (FIG. 5), or splitter 50 with jumper 81 (FIG. 8), low pass filters, high pass filters, or other additional hardware may also be integrated or housed internally within outlet 31. Alternatively, these devices may be external to the outlet. Moreover, the outlet may contain standard connectors for devices, such as DTE units. In one embodiment, only passive components are included within the outlet. For example, splitter 50 can have two transformers and two capacitors (or an alternative implementation consisting of passive components). In another embodiment, the outlet may contain active, power-consuming components. Three options can be used for providing power to such circuits:

1. Local powering: In this option, supply power is fed locally to each power-consuming outlet. Such outlets must be modified to support connection for input power.
2. Telephone power: In both POTS and ISDN telephone networks, power is carried in the lines with the telephone signals. This power can also be used for powering the outlet circuits, as long as the total power consumption does not exceed the POTS/ISDN system specifications. Furthermore, in some POTS systems the power consumption is used for OFF-HOOK/ON-HOOK signaling. In such a case, the network power consumption must not interfere with the telephone logic.
3. Dedicated power carried in the media: In this option, power for the data communication related components is carried in the communication media. For example, power can be distributed using 5 kHz signal. This frequency is beyond the telephone signal bandwidth, and thus does not interfere with the telephone service. The data communication bandwidth, however, be above this 5 kHz frequency, again ensuring that there is no interference between power and signals.

While the invention has been described with respect to a limited number of embodiments, it will be appreciated that many variations, modifications and other applications of the invention may be made.

What is claimed is:

1. An apparatus for configuring a local area network in a building for the transport of digital packet-based data signals and analog signals across a wiring using frequency domain multiplexed analog and digital packet-based data signals, wherein the wiring includes at least first and second wiring segments each comprising at least two conductors, the apparatus comprising:
    first and second ports each connectable to a respective one of said first and second wiring segments;
    first and second data filters each coupled to a respective one of said first and second ports, each having a digital data signal port operative to pass only digital packet-based data signals;
    first and second modems each coupled to said digital data signal port of a respective one of said first and second filters, operative for bi-directional digital packet-based data signal communication with a respective one of said first and second wiring segments;
    at least one data connector operative for establishing a bi-directional digital packet-based data connection with a data unit;
    a multiport unit coupling said first and second modems to said at least one data connector for packet-based data transfer between said modems and said at least one data connector, said multiport unit being constituted by one of a bridge and a router; and
    a single enclosure housing said ports, said data filters, said modems, said at least one data connector and said multiport unit.

2. The apparatus according to claim 1, further operative to couple a first analog signal to an analog unit the apparatus further comprising:
    an analog filter coupled to said first and second ports and having an analog signal port, said analog filter being operative to pass only the first analog signal; and
    an analog connector operative for establishing an analog signal connection with the analog unit, the analog connector being coupled to said analog signal port of said analog filter.

3. The apparatus according to claim 2, wherein the first analog signal is an analog telephone signal, and the analog unit is a telephone set.

4. The apparatus according to claim 1, wherein at least one of the wiring segments is a telephone wiring.

5. The apparatus according to claim 1, wherein the apparatus is at least partially housed within an outlet.

6. The apparatus according to claim 1, further comprising at least one power consuming component connected to at least one of the wiring segments and powered by a power signal carried by the at least one of the wiring segments.

7. The apparatus according to claim 6, wherein the power signal is carried in a frequency spectrum distinct from the analog and digital data signals.

8. The apparatus according to claim 6, wherein the power signal is an alternating current signal.

9. The apparatus according to claim 1, wherein:
the digital packet-based data signals are carried over at least one of the wiring segments and include a plurality of time division or frequency division multiplexed data channels;
said apparatus further comprises a plurality of data connectors each operative for establishing a bi-directional digital packet-based data connection with a data unit;
said data connectors are each coupled to the multiport unit; and
said apparatus is operative for coupling each data unit to a respective one of the data channels.

10. The apparatus according to claim 1, wherein said apparatus is attachable to a wall of a building.

11. A network for transporting data and analog signals, said network comprising:
first, second and third nodes; and
first and second wiring segments in a building, each comprising at least two conductors for simultaneously carrying frequency domain multiplexed data and analog signals, wherein:
said first wiring segment connects said first and second nodes together to form, with said first and second nodes, a first bi-directional packet-based digital communication link;
said second wiring segment connects said first and third nodes together to form, with said first and third nodes, a second bi-directional packet-based digital communication link;
each of said nodes is connectable to at least one data unit for coupling the connected data unit to at least one of said communication links;
said first node contains a coupling unit coupling said first and second communication links together;
said coupling unit is one of a bridge and a router; and
each of said nodes is housed within a single enclosure.

12. The network according to claim 11, wherein at least one of said nodes is connectable to at least one analog unit for coupling the analog unit to the analog signals carried over at least one of said wiring segments.

13. The network according to claim 12, wherein the analog signals comprise a telephone signal and the at least one analog unit is a telephone unit.

14. The network according to claim 11, wherein at least one of said nodes is at least in part included in an outlet.

15. The network according to claim 11, wherein at least one of said nodes is included in a telephone outlet.

16. The network according to claim 11, wherein at least one of said wiring segments is constituted by wiring previously installed in the building.

17. The network according to claim 11, wherein at least one of the wiring segments is constituted by telephone wiring.

18. The network according to claim 11, wherein at least one of the nodes comprises a power consuming component connected to at least one of said wiring segments and powered by a power signal carried by said at least one of the wiring segments.

19. The network according to claim 18, wherein the power signal is carried in a frequency spectrum distinct from the analog and data signals.

20. The network according to claim 18, wherein the power signal is an alternating current signal.

21. The network according to claim 11, wherein:
the digital data signals carried over at least one of said wiring segments include a plurality of time division or frequency division multiplexed data channels;
one of said nodes connected to said at least one of said wiring segments further comprises a plurality of data connectors each operative for establishing a bi-directional packet-based data signal connection with a data unit;
said data connectors are each coupled to said coupling unit; and
said one of said nodes connected to said at least one of said wiring segments is operative for coupling each data unit to a respective one of the data channels.

22. The network according to claim 11, wherein at least one of said nodes is connected to an analog unit located external to the building.

23. The network according to claim 11, wherein at least one of said nodes is connected to a data unit located external to the building.

24. The network according to claim 11, wherein:
the analog signals are telephone signals;
at least one of said nodes is coupled to a remote data unit external to the building; and
at least one of said nodes is coupled to a remote telephone service unit external to the building.

25. The network according to claim 24, wherein the network further transports at least one telephone signal between the remote telephone service unit and at least one telephone device coupled to at least one of said nodes.

26. The network according to claim 24, wherein at least one of said nodes is at least in part included in an outlet.

27. The network according to claim 24, wherein at least one of said nodes is included in a telephone outlet.

28. The network according to claim 24, wherein at least one of the wiring segments is constituted by wiring previously installed in the building.

29. The network according to claim 24, wherein at least one of said wiring segments is constituted by telephone wiring.

30. The network according to claim 24, wherein the telephone signals are digitized telephone signals.

31. The network according to claim 24, wherein at least one of the nodes comprises a power consuming component connected to at least one of said wiring segments and powered by a power signal carried by said at least one of said wiring segments.

32. The network according to claim 31, wherein the power signal is carried in a frequency spectrum distinct from the digital data and telephone signals.

33. The network according to claim 31, wherein the power signal is an alternating current signal.

34. The network according to claim 24, wherein:
the digital data signals carried over at least one of said wiring segments includes a plurality of time division or frequency division multiplexed data channels;
one of said nodes connected to said at least one of said wiring segments further comprises a plurality of data connectors each operative for establishing a data signal connection with a data unit;
said data connectors are each coupled to said coupling unit; and
said one of said nodes connected to said at least one of said wiring segments is operative for coupling each data unit to a respective one of the data channels.

* * * * *